Figure 1:
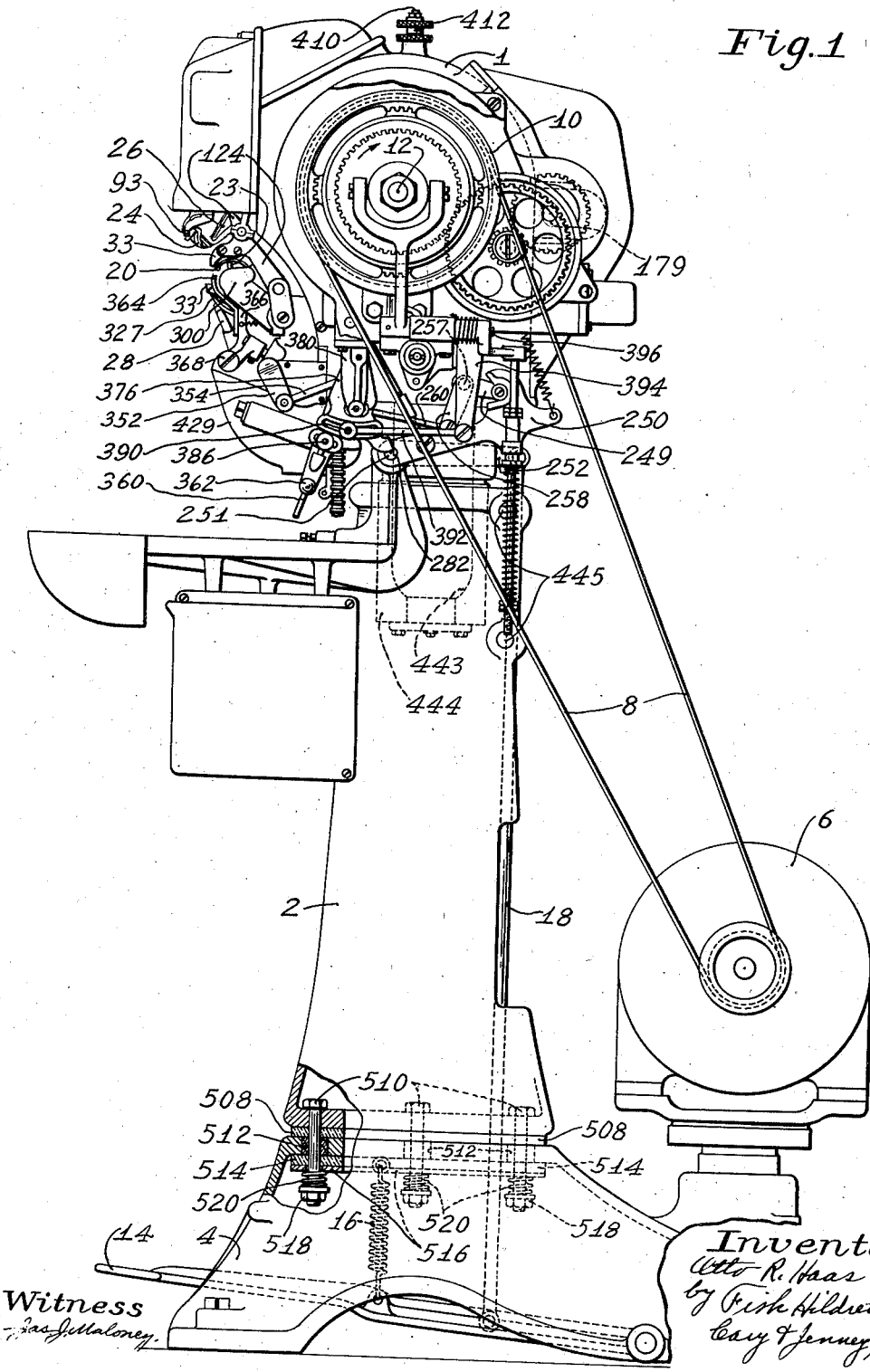

Feb. 21, 1939.  O. R. HASS  2,148,197
SEWING MACHINE
Filed April 29, 1936   19 Sheets-Sheet 3

Feb. 21, 1939.  O. R. HASS  2,148,197
SEWING MACHINE
Filed April 29, 1936  19 Sheets-Sheet 8

Witness
Jas. J. Maloney.

Inventor
Otto R. Hass
by Fish Hildreth
Cary & Jenney Attys.

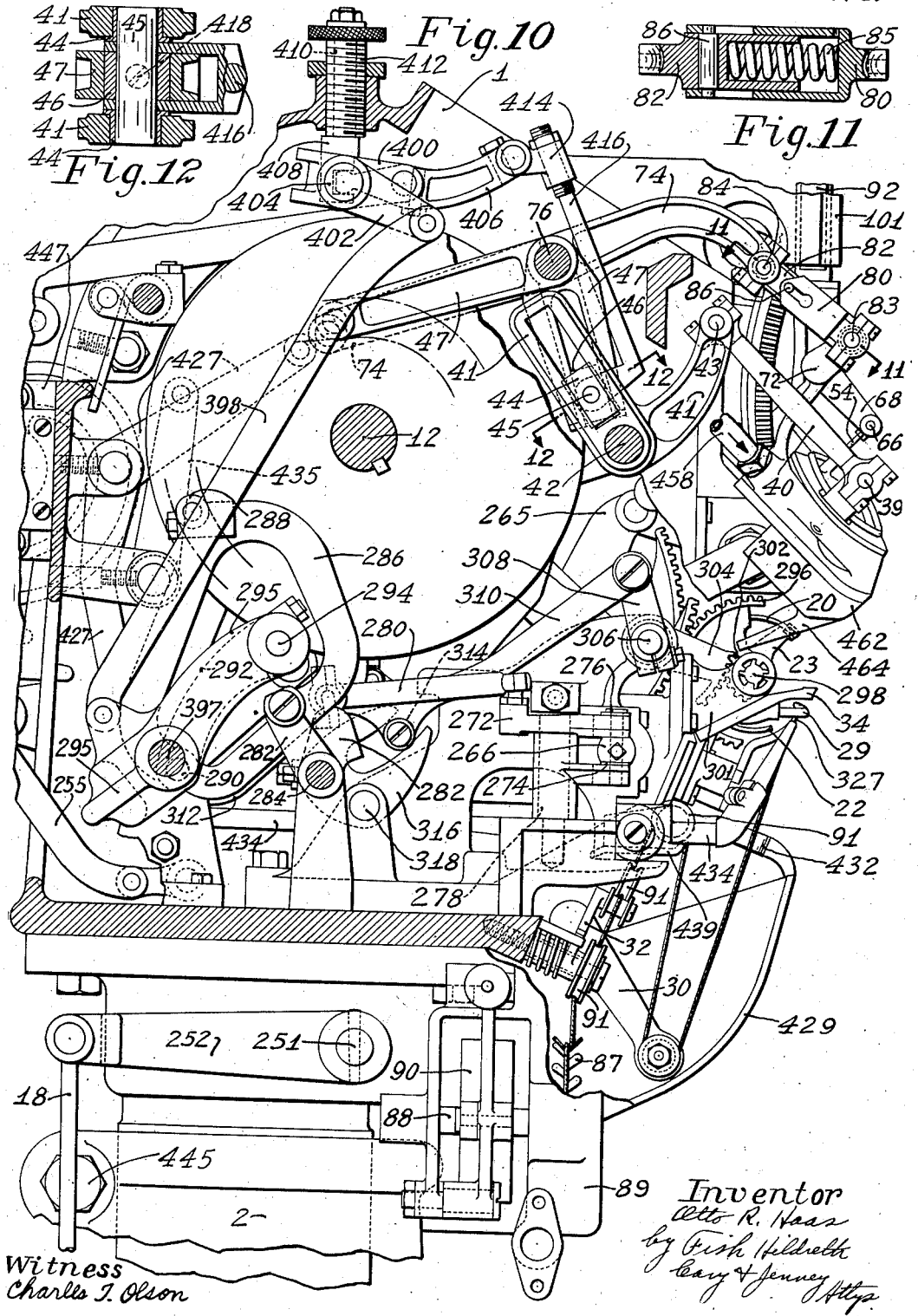

Feb. 21, 1939.　　　　　　O. R. HASS　　　　　　2,148,197
SEWING MACHINE
Filed April 29, 1936　　　19 Sheets-Sheet 11

Witness
Charles J. Olson

Inventor
Otto R. Haas
by Fish Hildreth
Cary & Jenney Attys

Feb. 21, 1939.    O. R. HASS    2,148,197
SEWING MACHINE
Filed April 29, 1936    19 Sheets-Sheet 12

Witness
Jas. J. Maloney

Inventor
Otto R. Haas
by Fish Hildreth
Cary & Jenney Attys

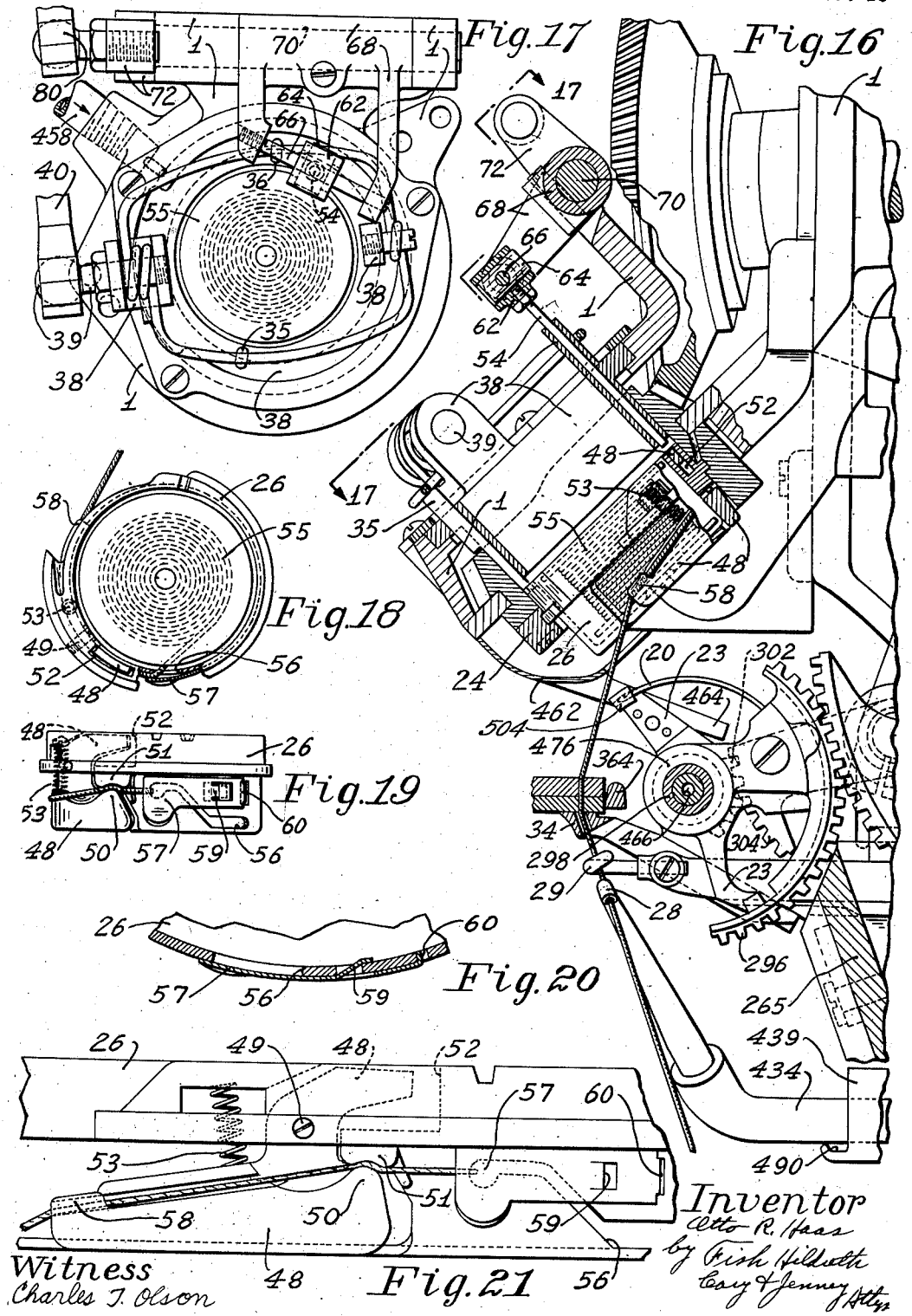

Feb. 21, 1939.     O. R. HASS     2,148,197
SEWING MACHINE
Filed April 29, 1936     19 Sheets-Sheet 14

Witness
Jas. J. Maloney

Inventor
Otto R. Haas
by Fish Hildreth
Cary & Jenney Attys.

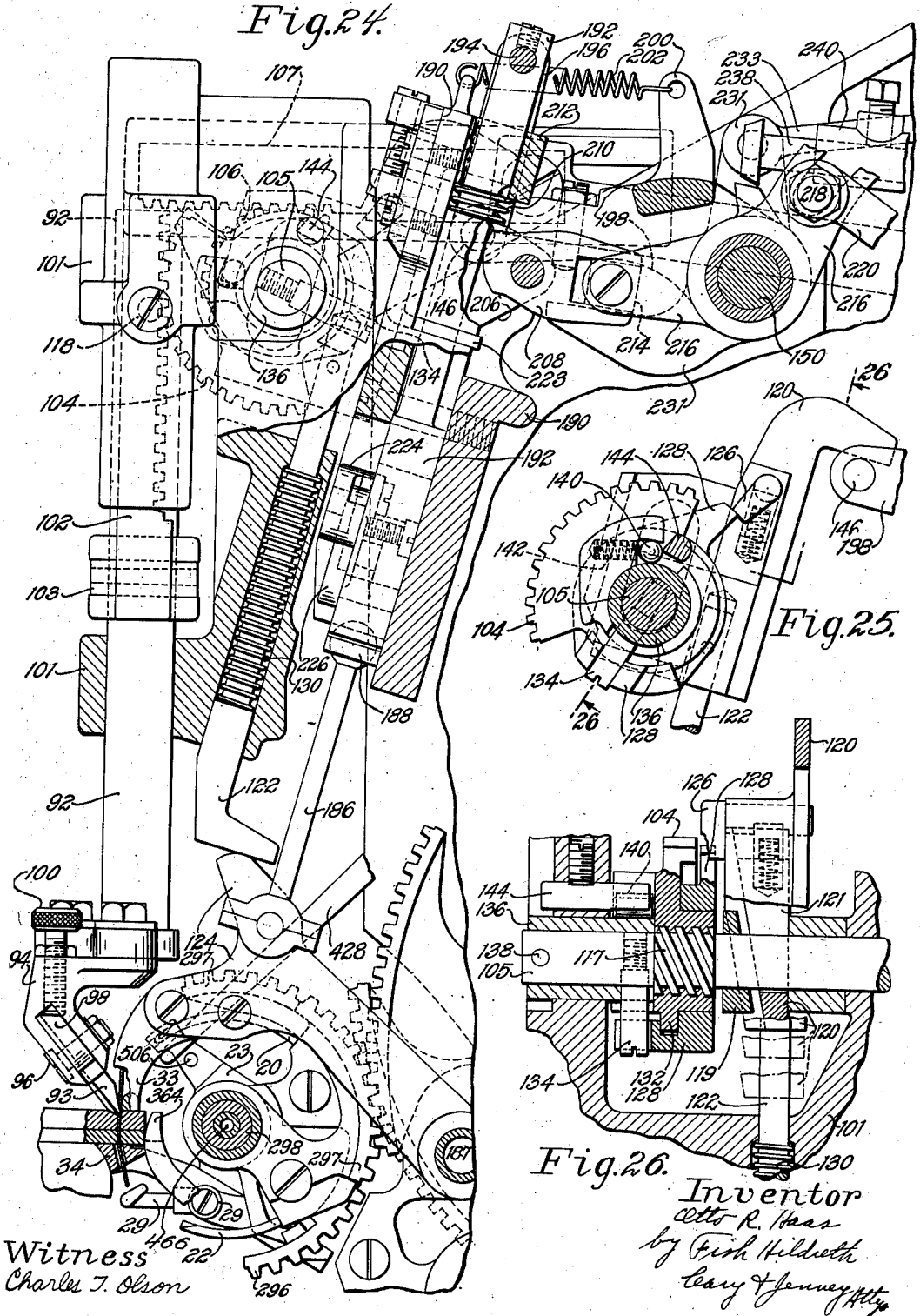

Feb. 21, 1939.                    O. R. HASS                    2,148,197
                               SEWING MACHINE
                            Filed April 29, 1936            19 Sheets-Sheet 16
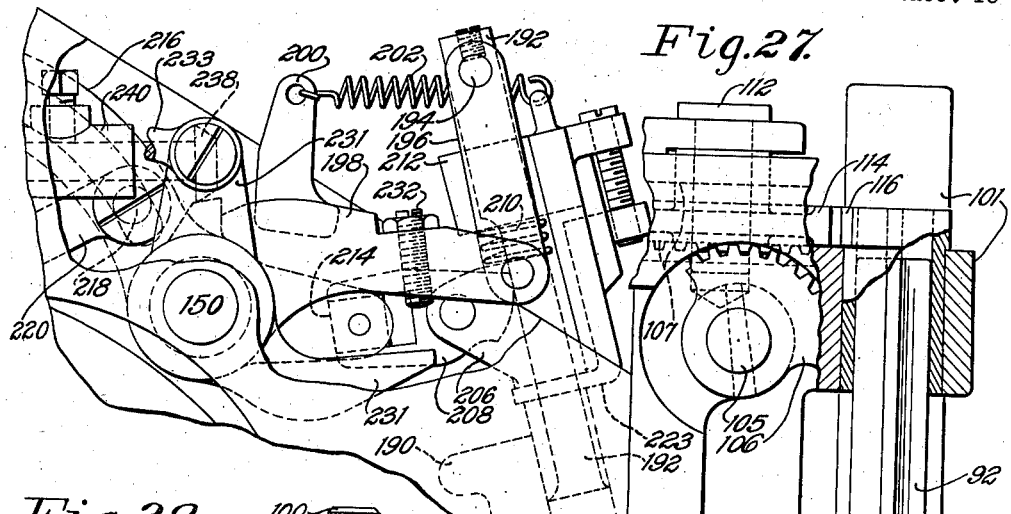
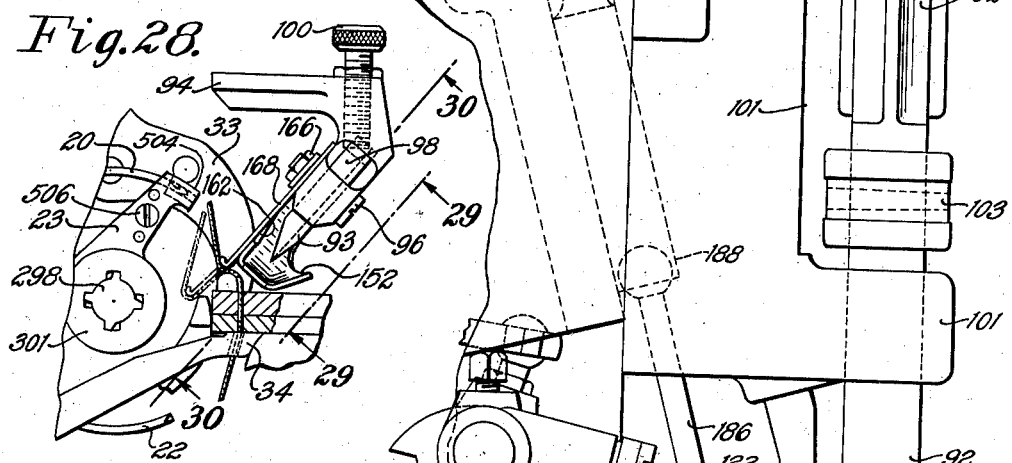
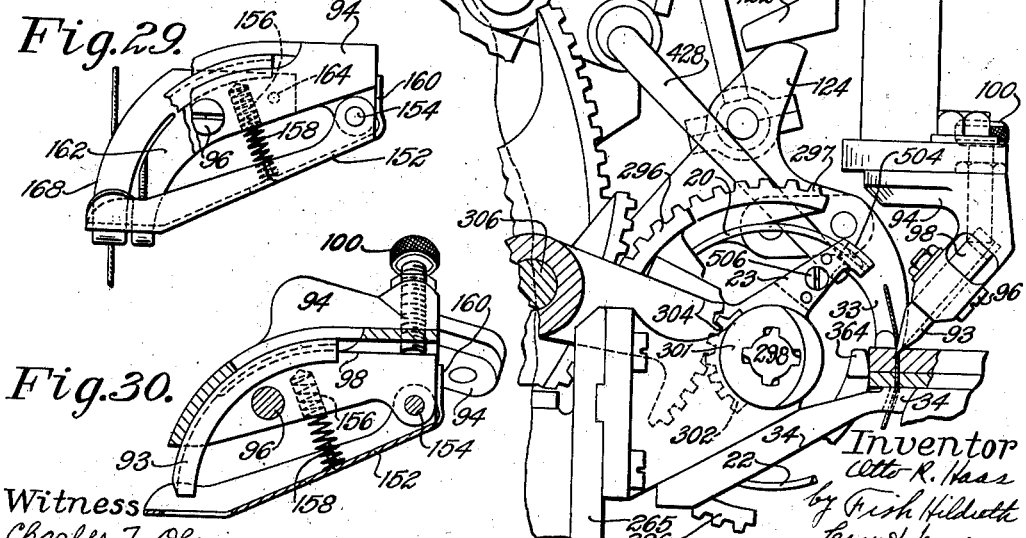
Witness
Charles T. Olson
Inventor
Otto R. Hass

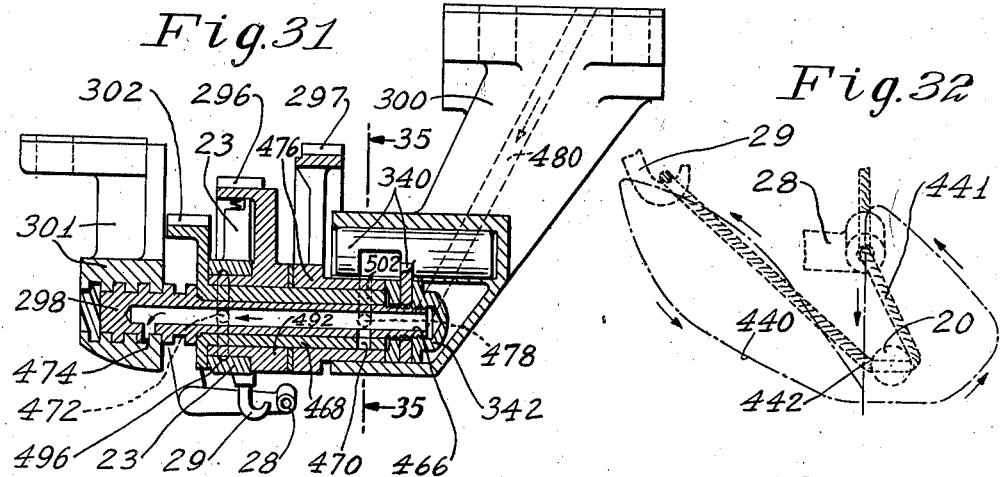
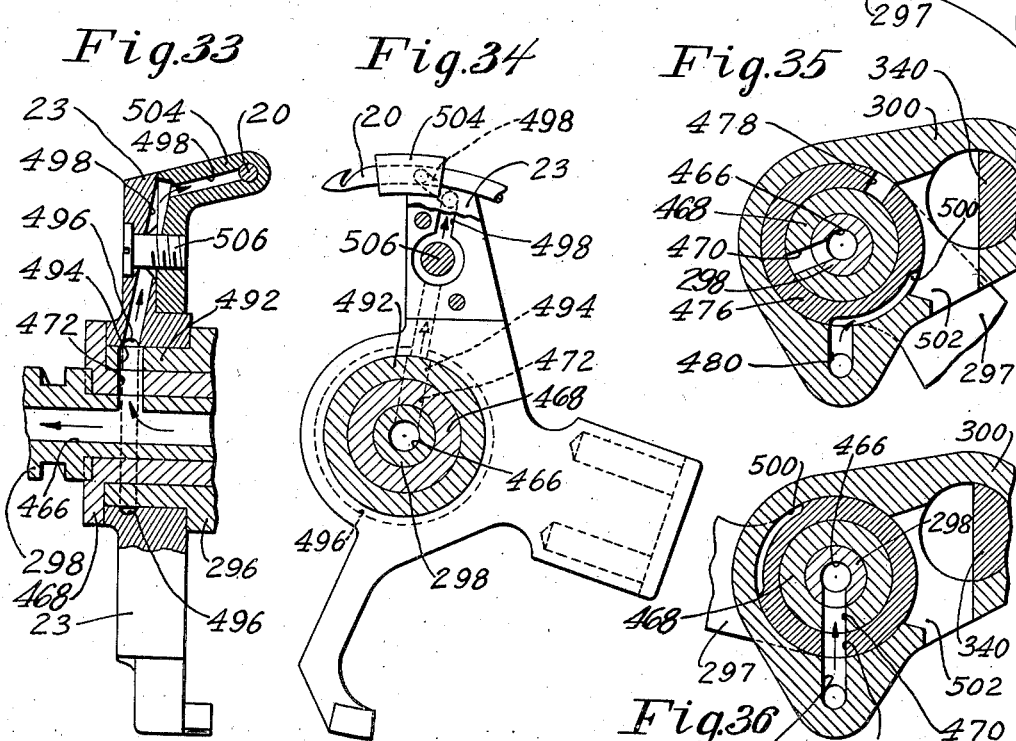

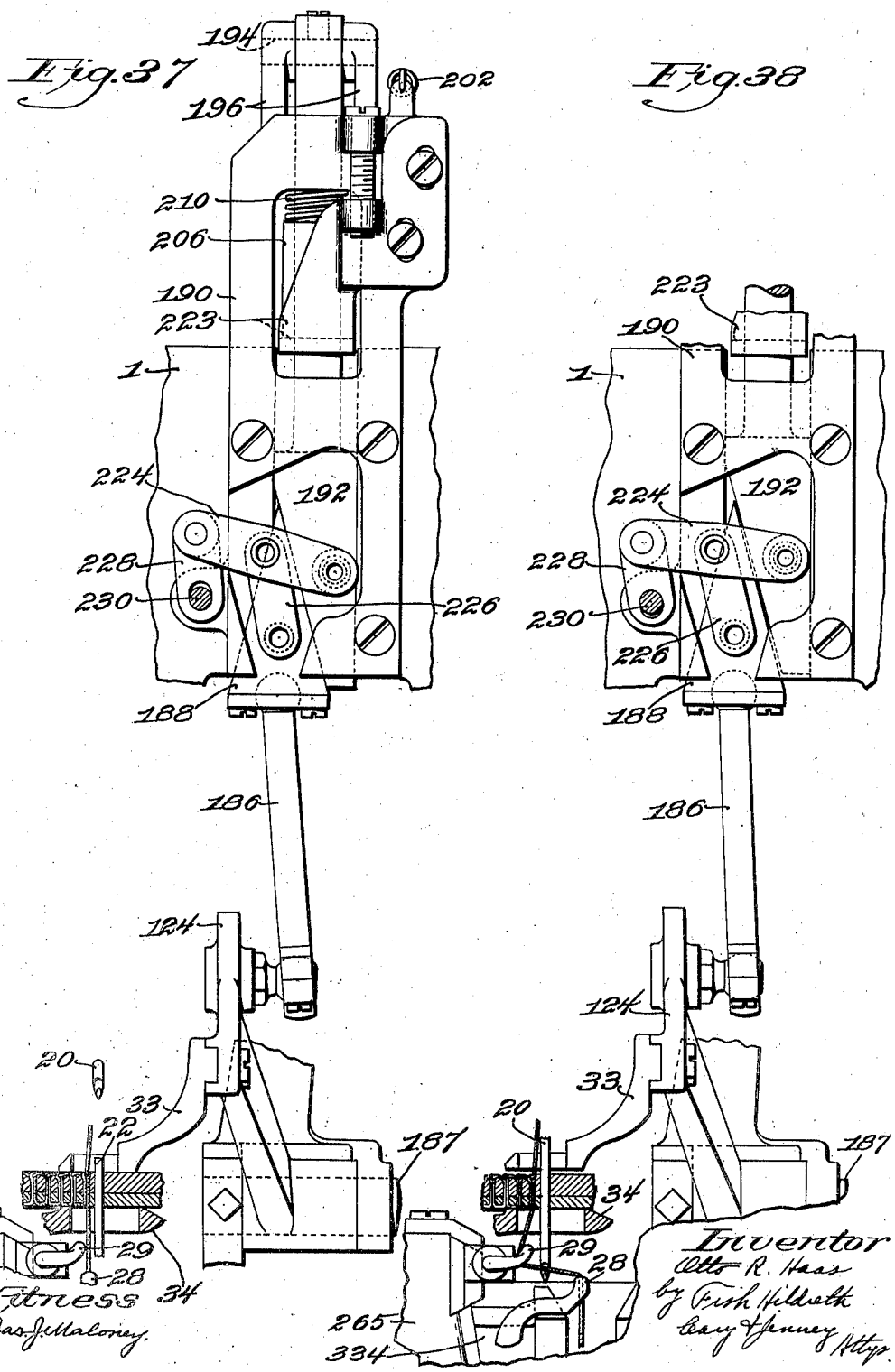

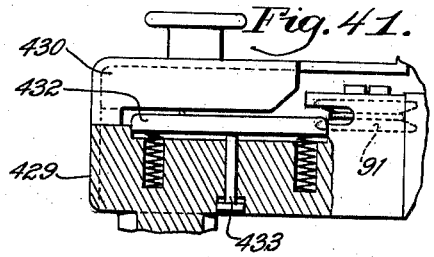
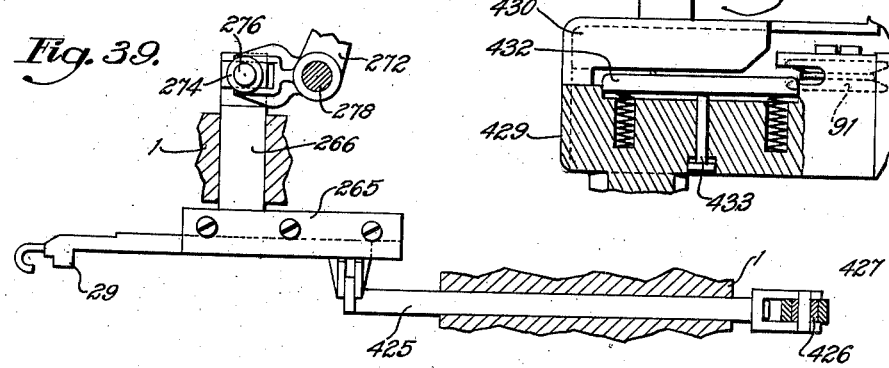
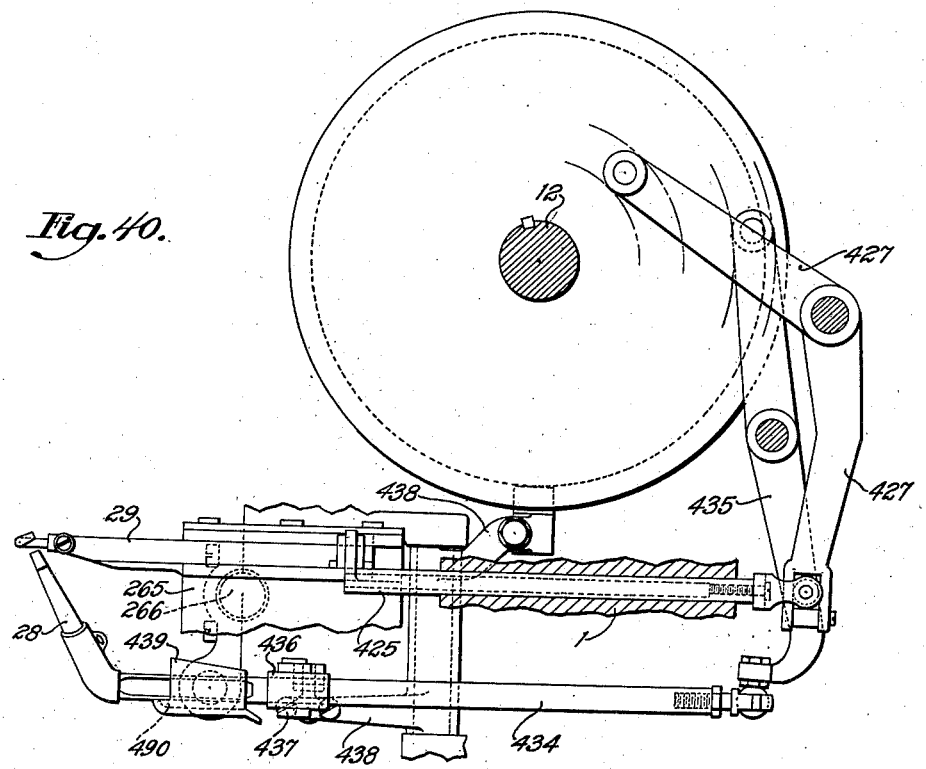

Patented Feb. 21, 1939

2,148,197

UNITED STATES PATENT OFFICE 2,148,197

SEWING MACHINE

Otto R. Haas, North Beverly, Mass., assignor to United Shoe Machinery Corporation, Paterson, N. J., a corporation of New Jersey Application April 29, 1936, Serial No. 76,924

27 Claims. (Cl. 112—38)

The present invention relates to shoe sewing machines, and is intended primarily as an improvement in wax thread lockstitch sewing machines of the type adapted to stitch the outsole to the welted upper and insole of a shoe. Certain features of the invention, however, may be used to advantage in connection with chain stitch sewing machines or with sewing machines other than outsole stitchers.

The objects of the invention are to simplify and improve the construction and mode of operation of a wax thread sewing machine and to render it more efficient as compared to other sewing machines of the type referred to, when sewing at high speeds, or to permit more accurate control of operations than in machines heretofore in common use.

The several features of the invention are herein illustrated as embodied in a curved hook needle lockstitch shoe sewing machine in which the stitch forming devices are similar in many respects to those disclosed in U. S. Letters Patent No. 2,031,479 of February 18, 1936, and No. 2,045,643 of June 30, 1936, both in the name of the present inventor. In the machine of these patents, before the needle and locking threads are interlocked in forming each stitch, a length of locking thread is drawn off in a measured amount from a supply contained within the locking thread case of the machine. To prevent further withdrawal of locking thread from the thread case and to set the stitch, a uniform distance within the work, there is provided a thread lock on the thread case arranged to grip the thread as each stitch is being set and to release the thread while the measured amount is being withdrawn. To insure that each measured amount of thread and no more shall be withdrawn from the thread case, it is desirable that the thread lock be operated to retain a grip on the thread as long as possible between the time the thread is withdrawn and the time the measured thread is used. However, due to the necessity of passing the needle thread loops freely about the thread case and due to required limitations in timing, there are certain practical difficulties in so operating any lock or other thread gripper provided on the thread case. In the machines of the patents referred to, the thread lock on the thread case is actuated directly by the rotary loop taker which passes the loops of needle thread about the thread case to interlock the threads, but such an arrangement is objectionable, particularly when the loop taker is rotated continuously a number of times in each sewing cycle as is usual practice in a high speed machine.

One feature of the present invention, therefore, contemplates the provision in a lockstitch sewing machine having a thread lock on the thread case, of a lock actuating member arranged for movement relatively to the loop taker so as not to be limited in its operation by either the looping movements of the loop taker or the passage of the needle loop about the thread case. In applicant's prior machines, the thread case is held from rotation within the loop taker by suitably cooperating devices and, in the machine hereinafter described, the member for actuating the thread lock is mounted on the means for supporting said devices and is arranged for movement towards and from the thread case in proper relation with the movement of the needle loop about the thread case to avoid obstructing the passage of the needle loop between the lock actuating member and the thread lock during each stitching cycle.

Other features of the invention contemplate new and improved thread locking and tensioning devices mounted on the locking thread case, a new and improved looper actuating mechanism, and new and improved constructions and arrangements for actuating and controlling certain of the operating parts of the machine both while the machine is running and when it is stopped at the completion of a seam.

These and other features of the invention including certain novel and improved constructions and arrangements of parts are hereinafter described in the following detailed specification, and more particularly pointed out in the appended claims.

Figure 2:
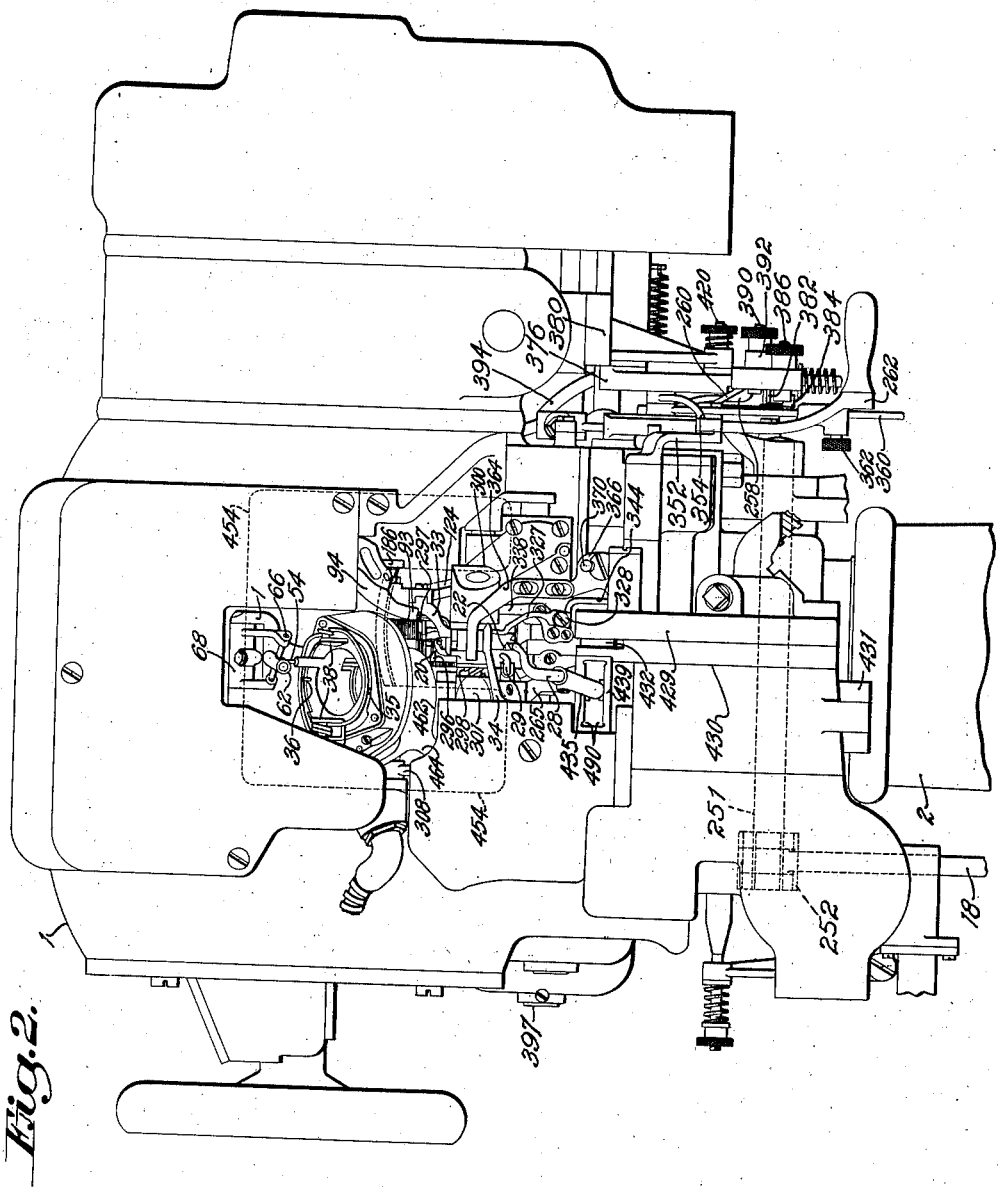
Figure 3:
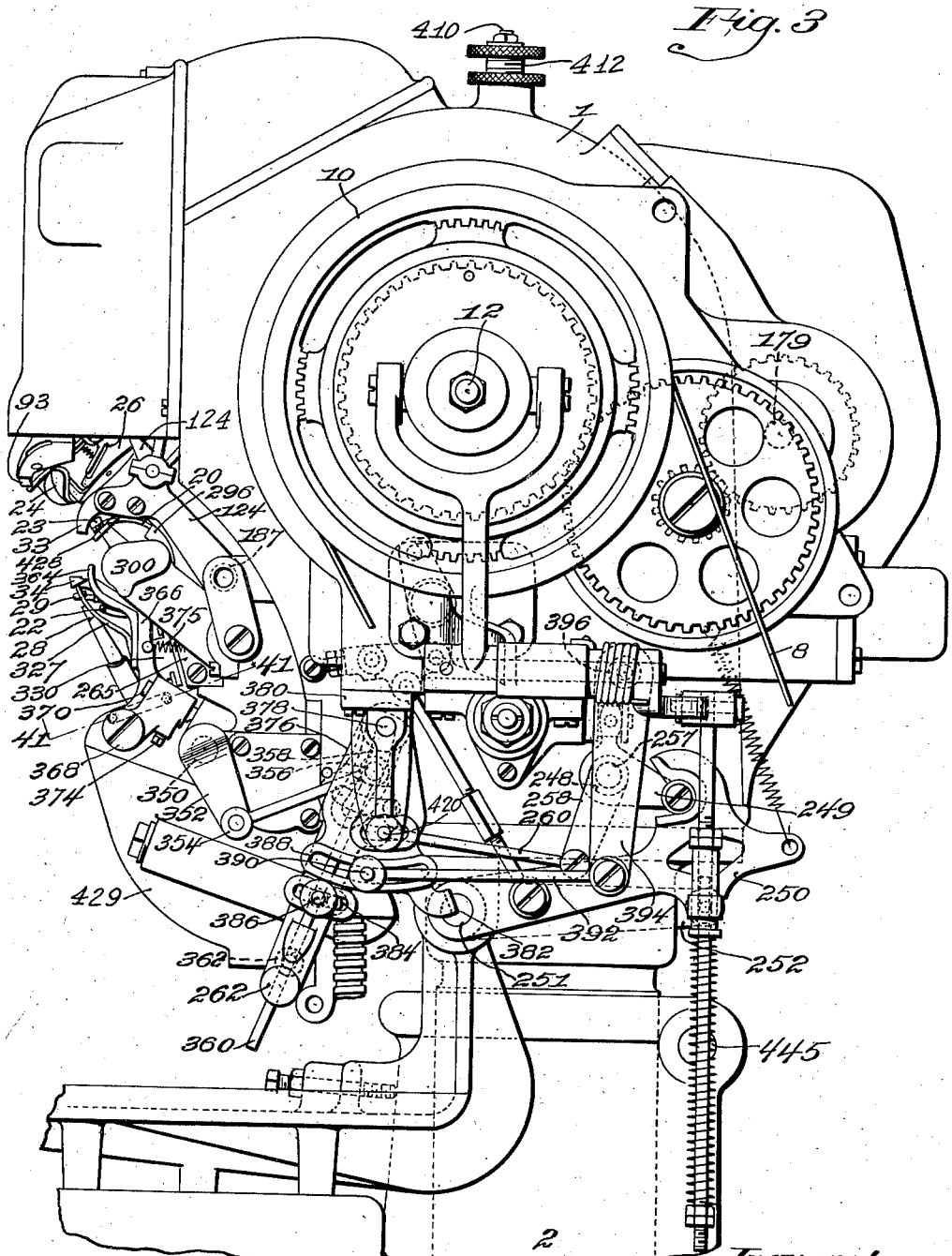
Figure 4:
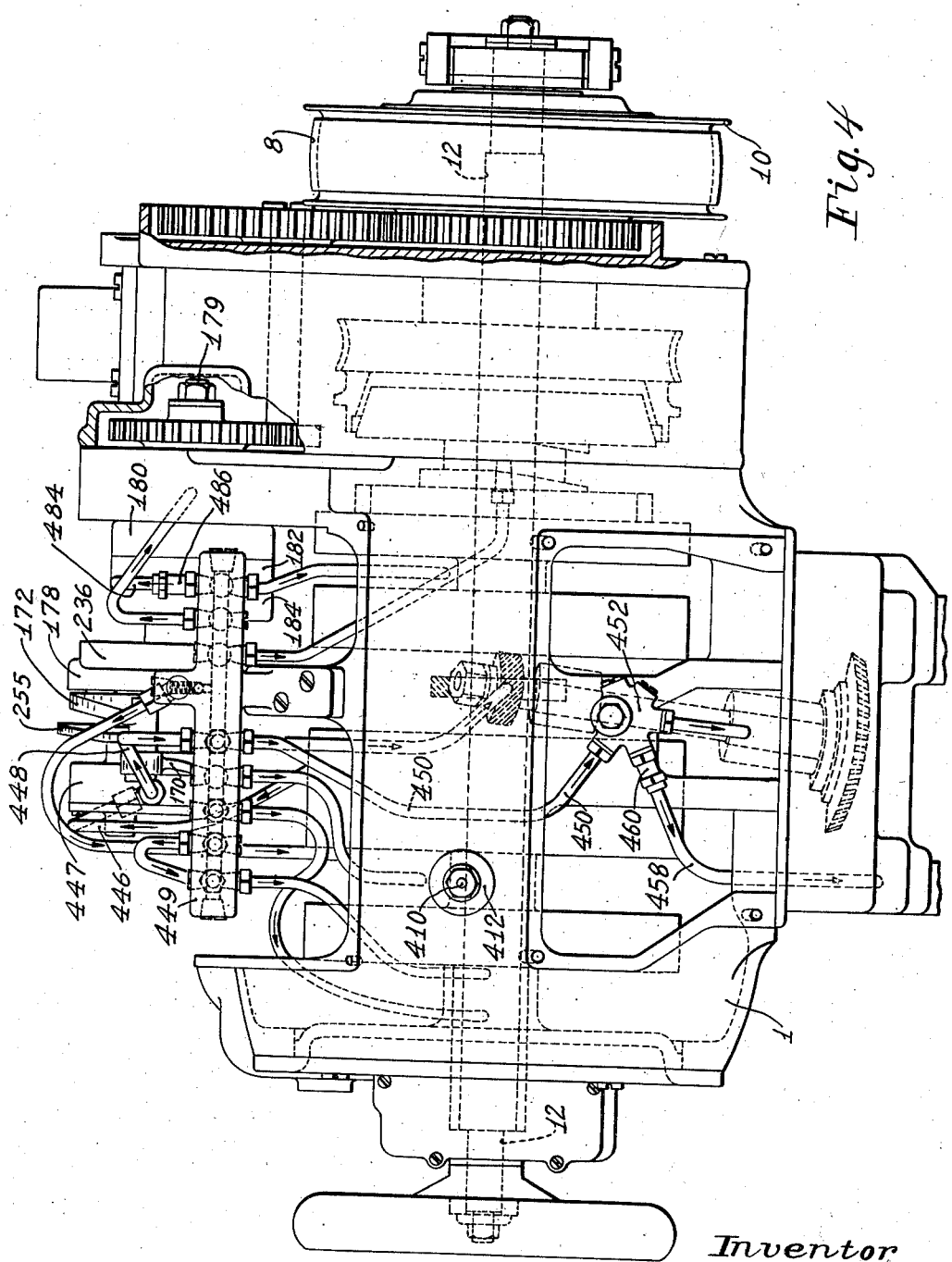
Figure 5:
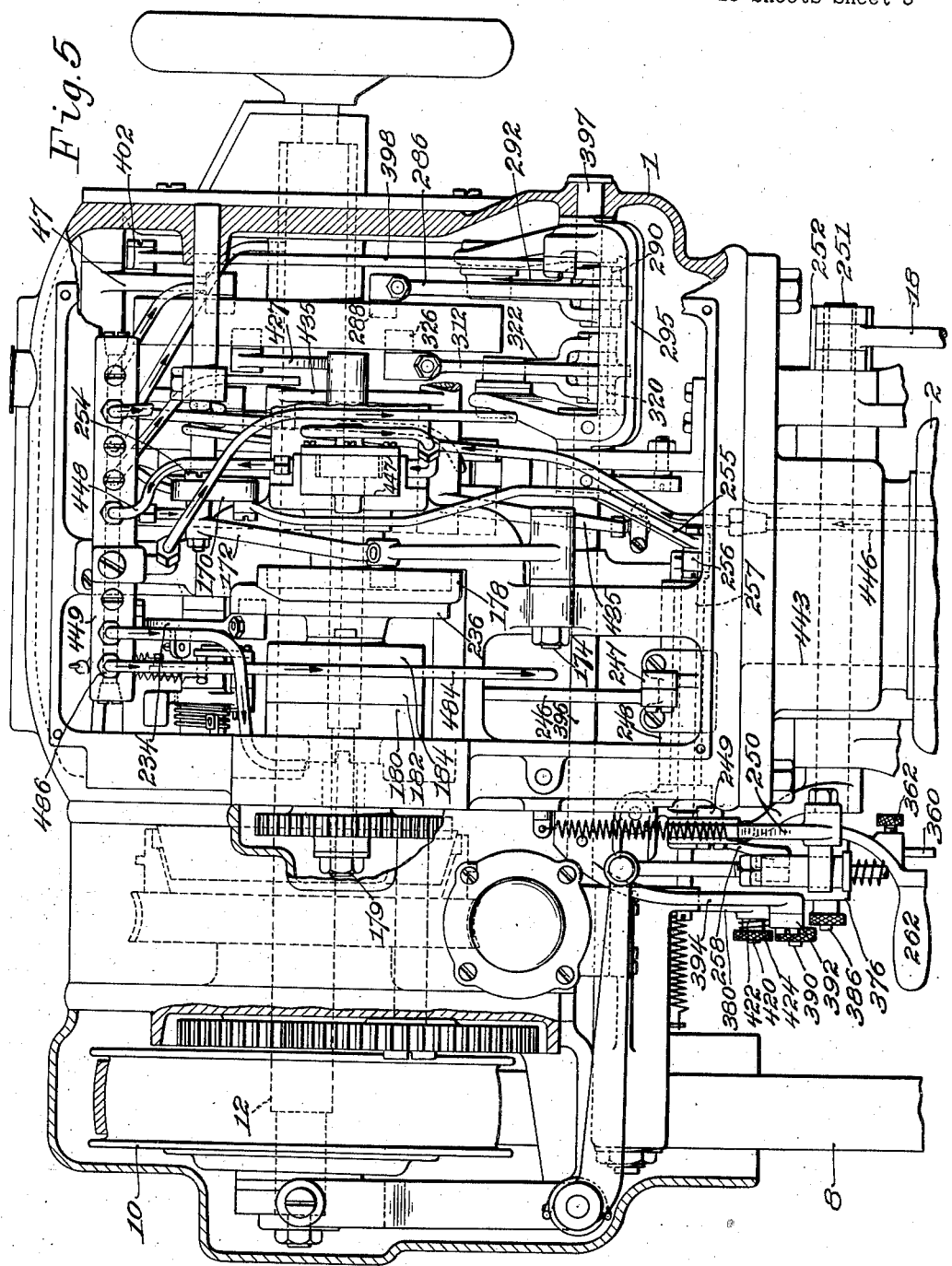
Figure 6:
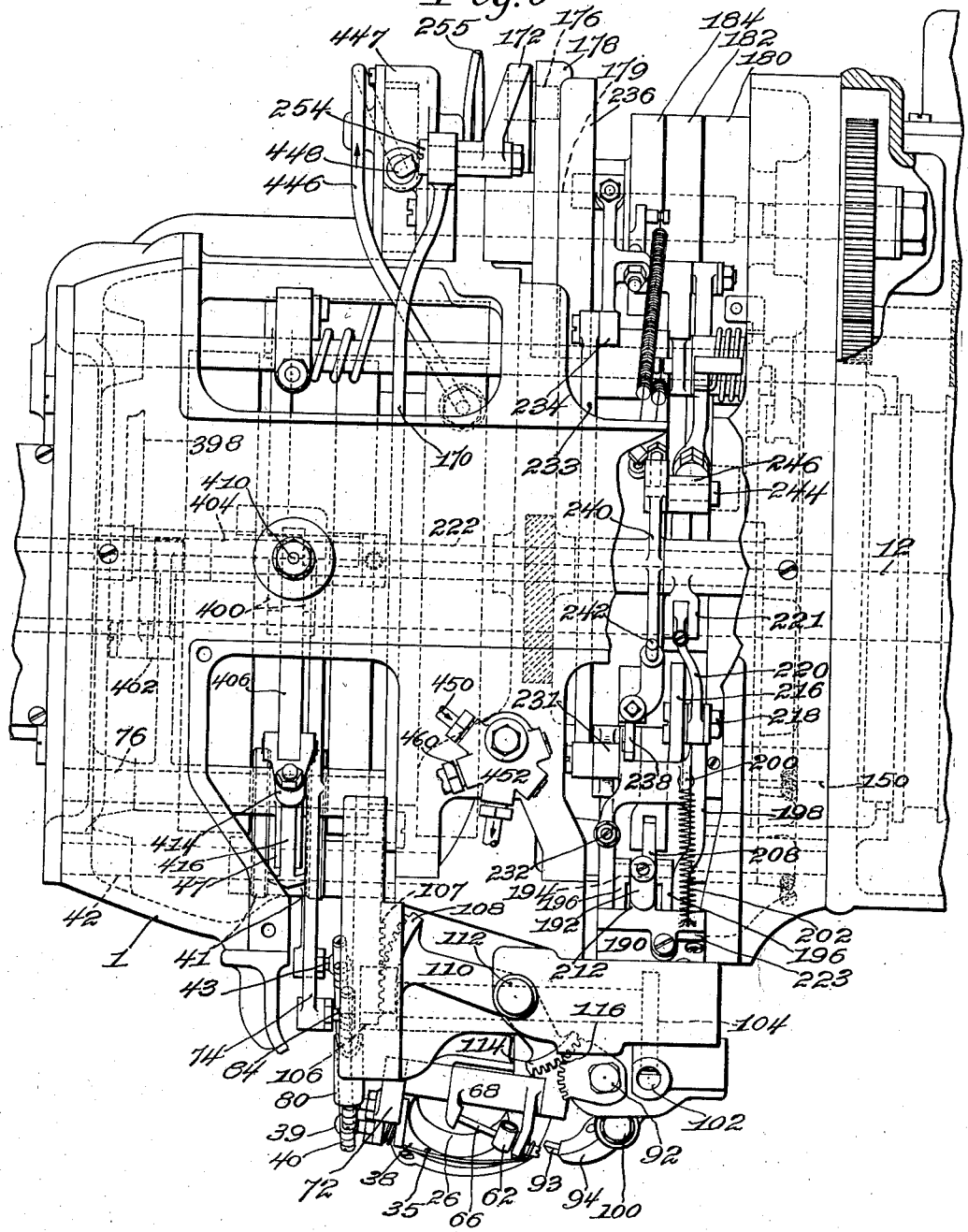
Figure 7:
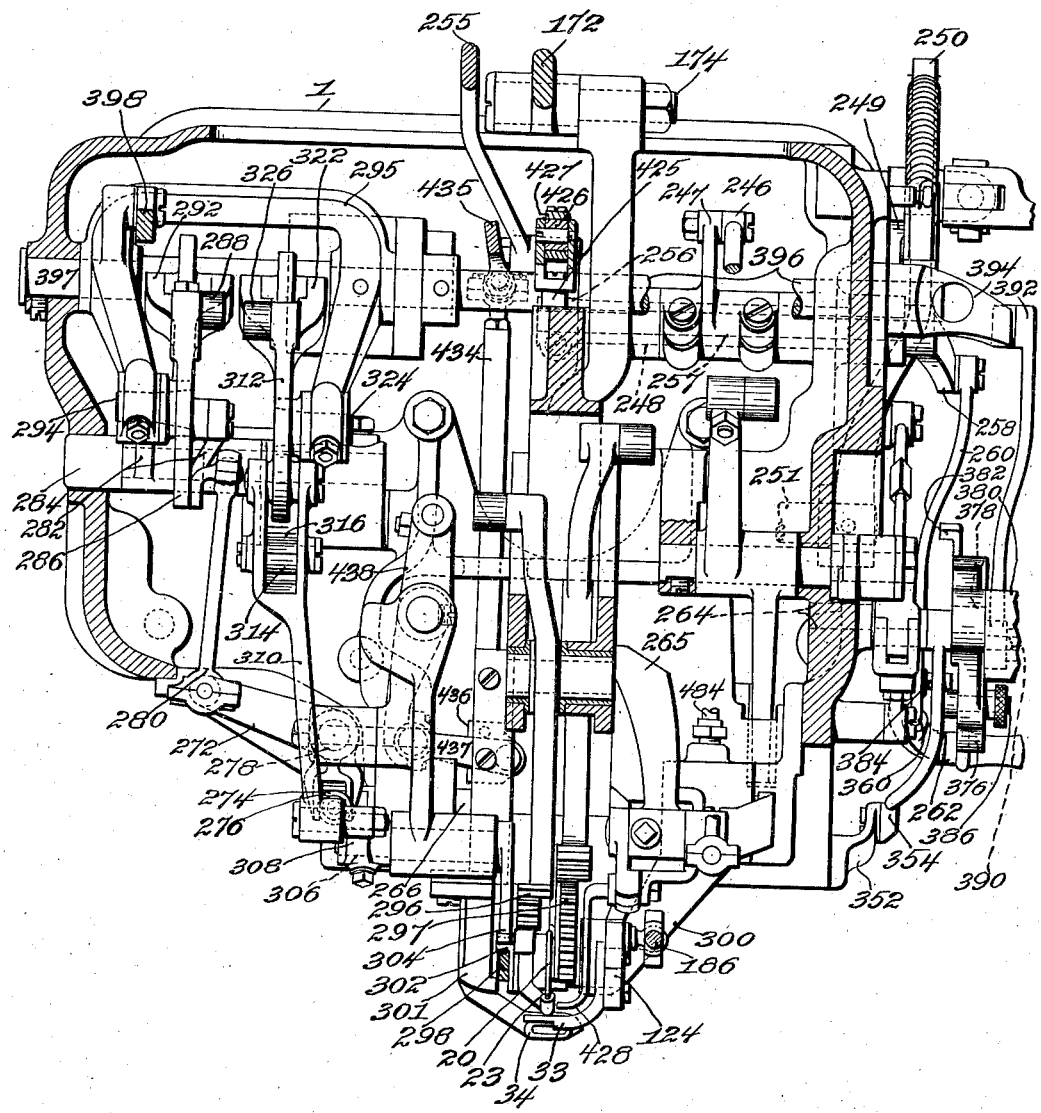
Figure 8:
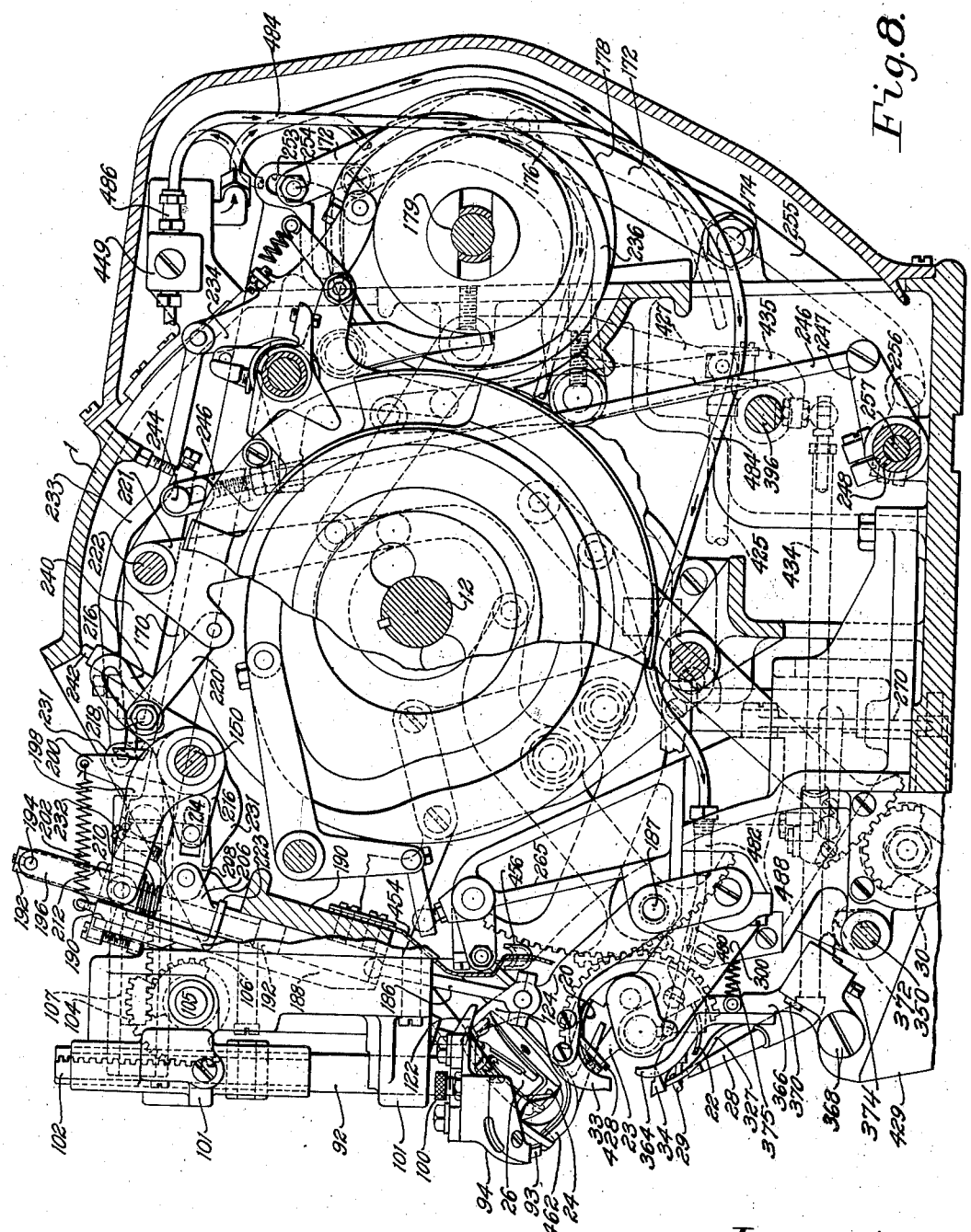
Figure 9:
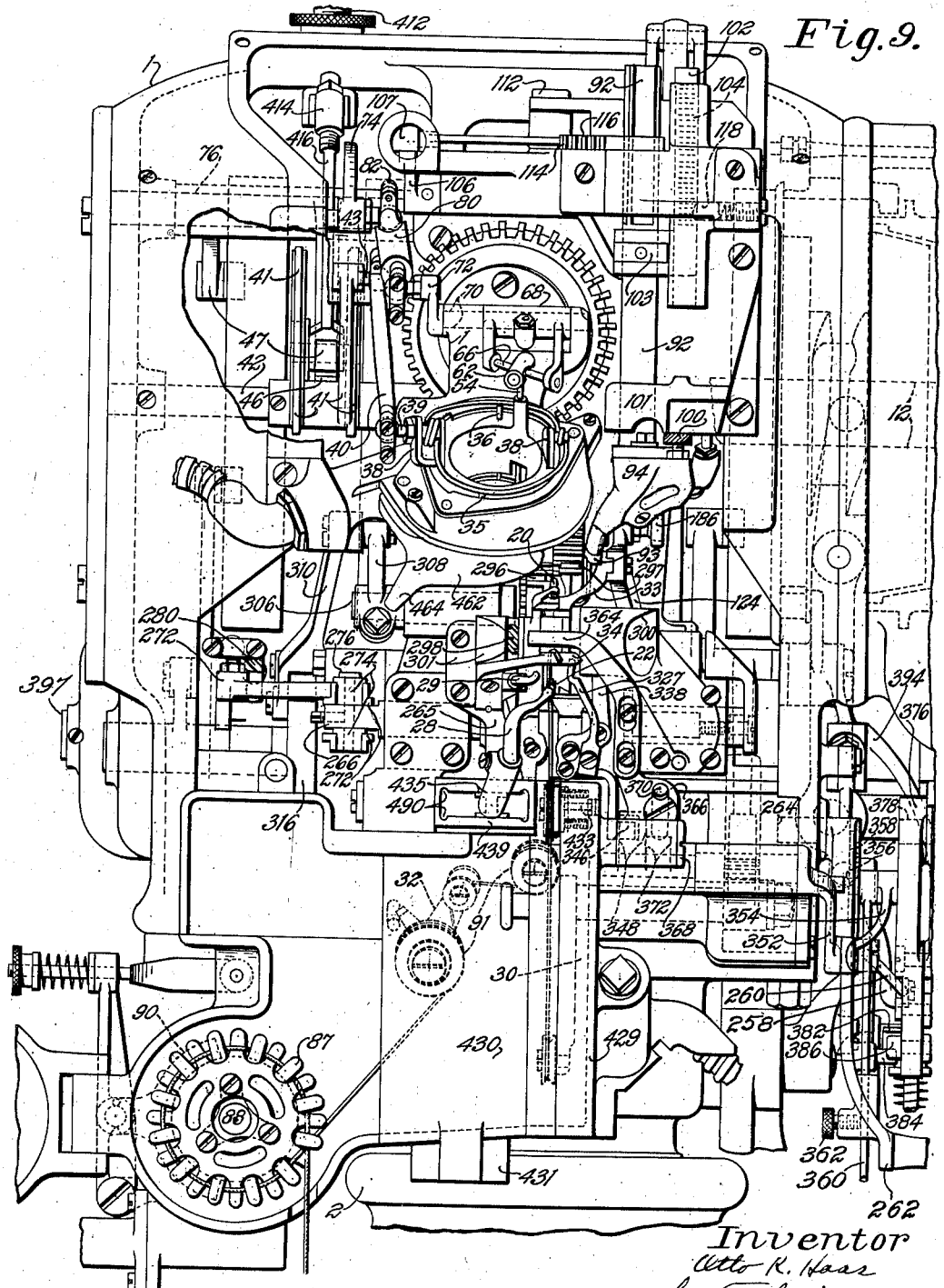
Figure 13:
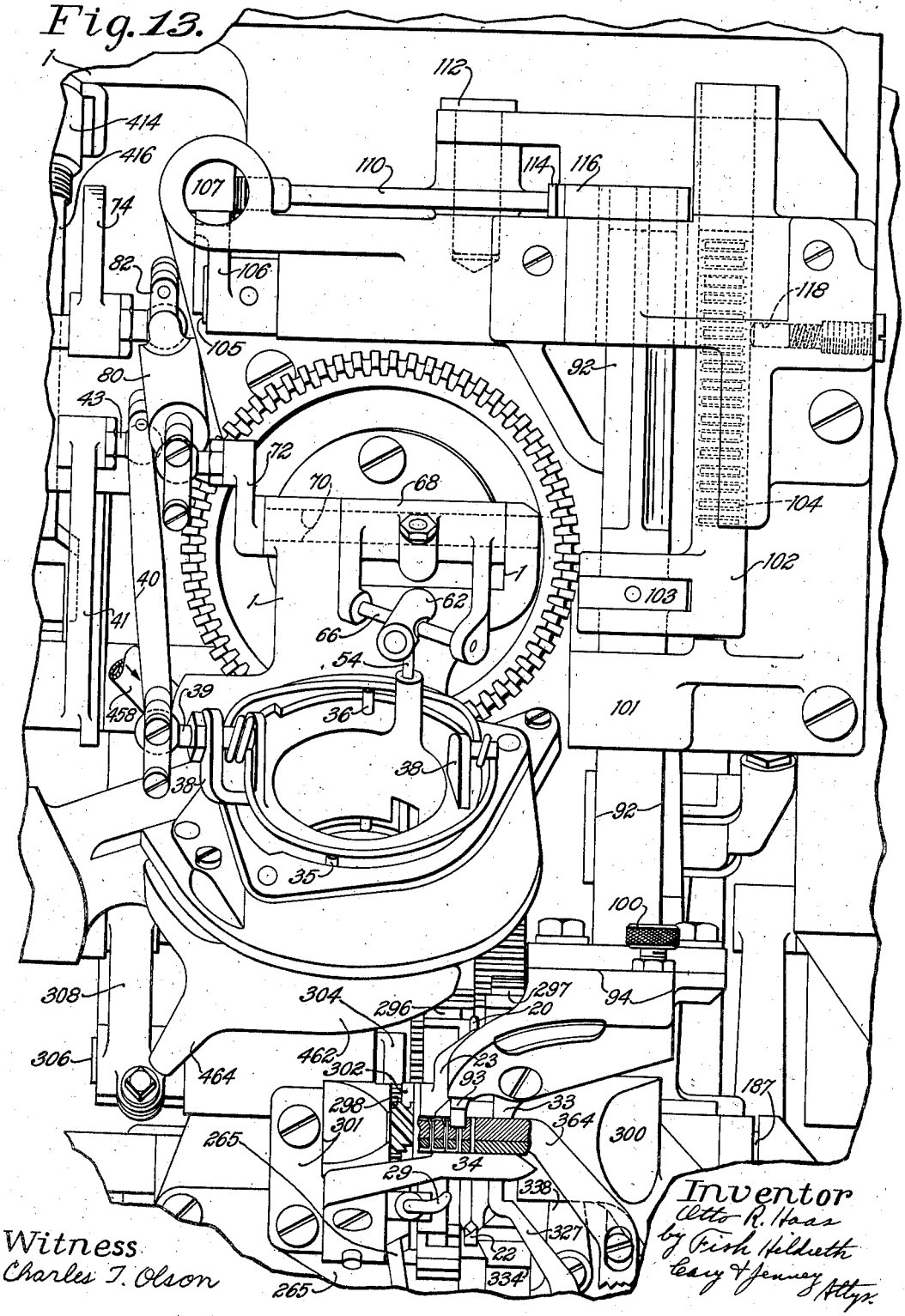
Figure 14:
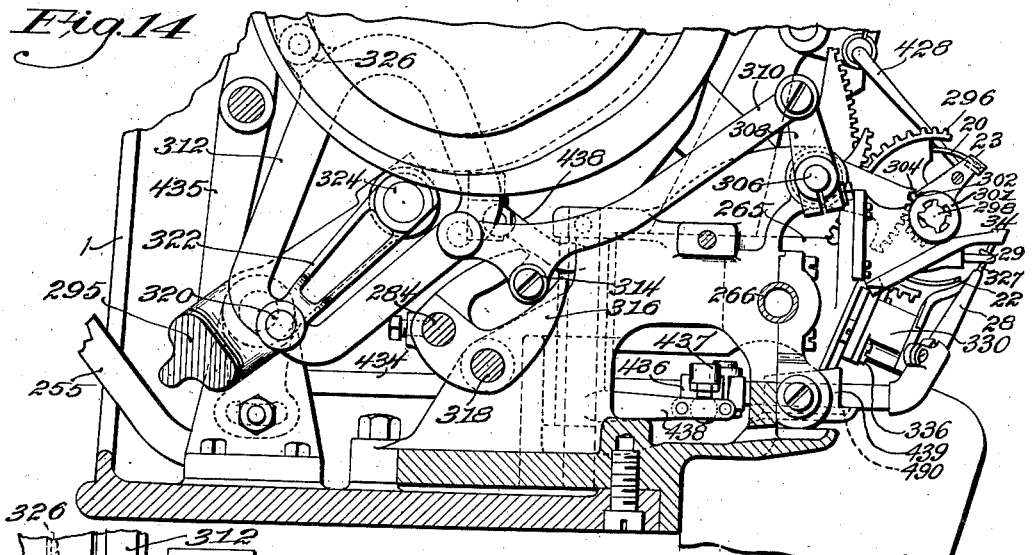
Figure 15:
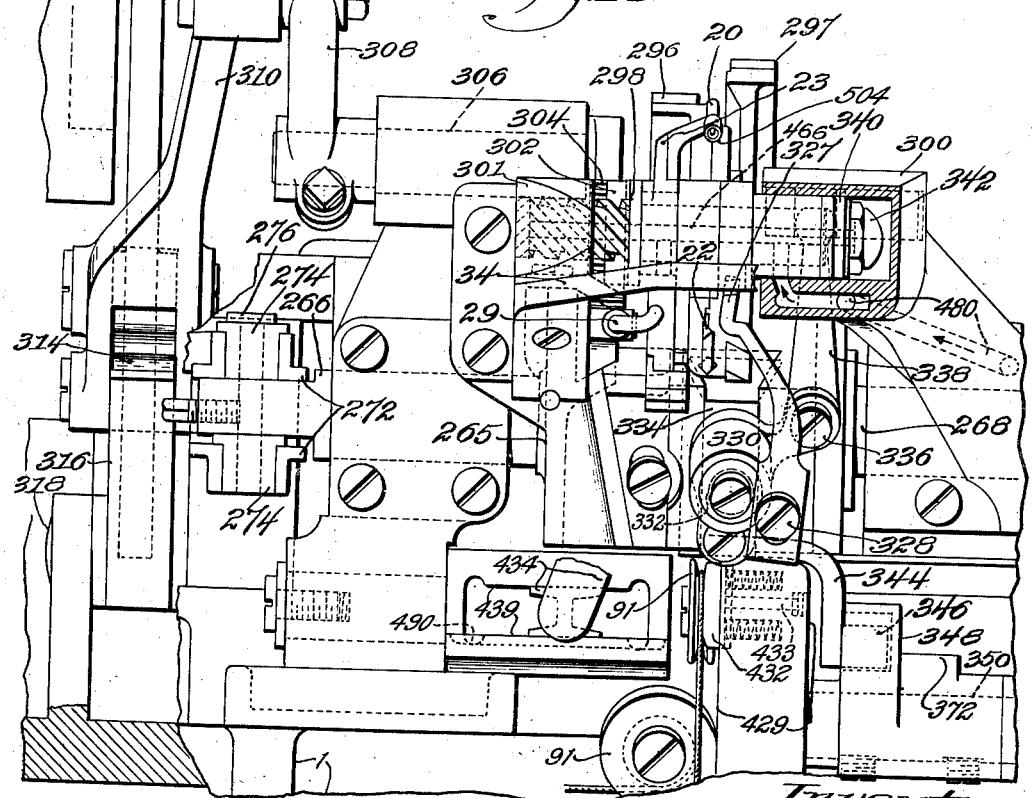
Figure 22:
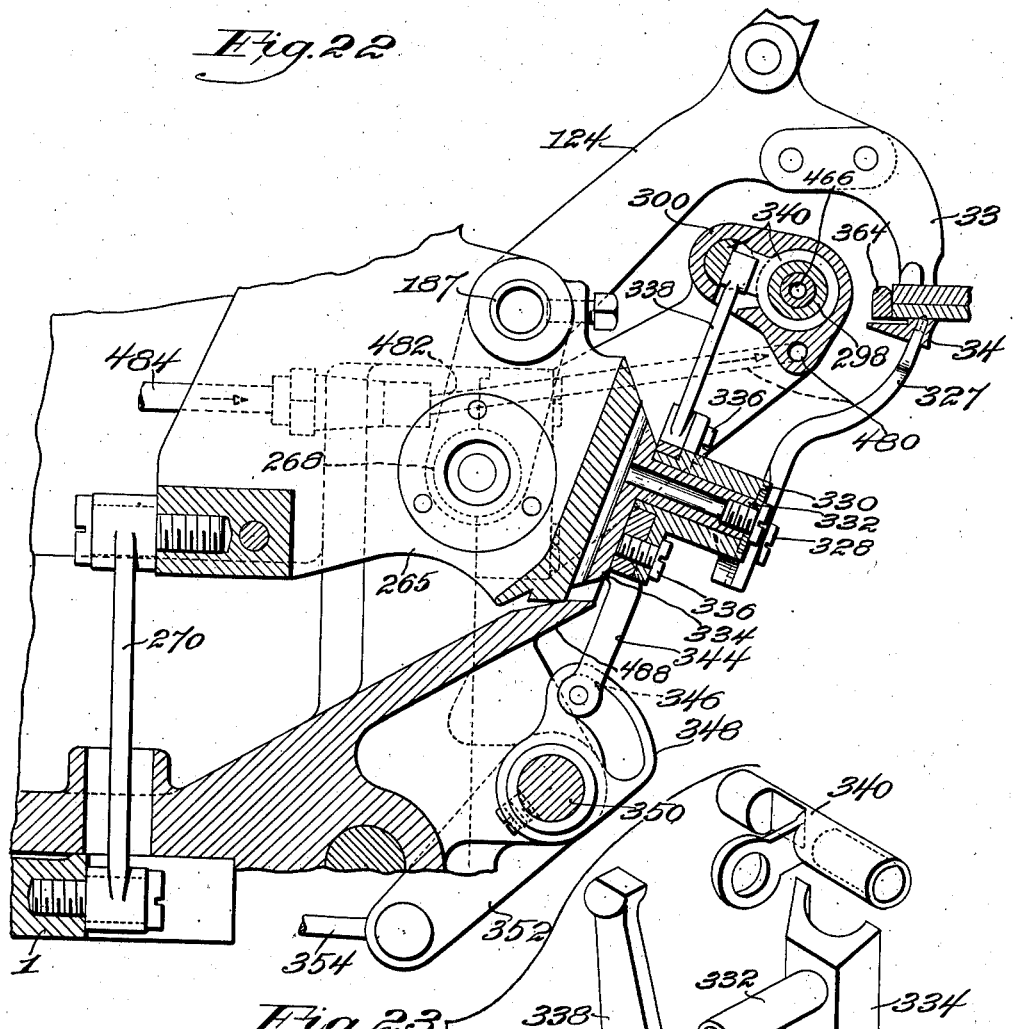
Figure 23:

In the drawings, Figure 1 is a view in side elevation looking from the right of a lockstitch shoe sewing machine embodying the features of the present invention; Figure 2 is a view in front elevation on an enlarged scale of the sewing head of the machine; Figure 3 is a view in side elevation, taken from the right, on a further enlarged scale of the sewing head; Figure 4 is a plan view of the head with the enclosing covers removed, parts having been broken away; Figure 5 is a view in rear elevation of the sewing head broken away, and shown partly in section; Figure 6 is a plan view of a portion of the sewing head on a still further enlarged scale with certain parts broken away to illustrate the operating mechanism; Figure 7 is a sectional plan view of a portion of the sewing head with the enclosing covers removed; Figure 8 is a sectional side elevation of the sewing head looking from the right; Figure 9 is a view, in front elevation, of the sewing head with the covers removed; Figure 10 is a sectional elevation as viewed from the left, of a portion of the sewing head; Figure 11 is a detail of a part of the locking thread measuring connections on an enlarged scale shown in section taken along the line 11—11 of Figure 10; Figure 12 is a sectional view of another portion of the locking thread measuring conections taken along the line 12—12 of Figure 10; Figure 13 is a view in front elevation on a further enlarged scale of a portion of the machine showing the thread cutter in actuated position; Figure 14 is a view in side elevation and in section, looking from the left of the lower part of the sewing head; Figure 15 is a view in front elevation and in section on an enlarged scale, of certain portions of the machine surrounding the stitch-forming devices; Figure 16 is a view in side elevation and in section, looking from the right of the machine in a running position, indicating more particularly the construction of the shuttle; Figure 17 is a plan of the shuttle, as viewed along the line 17—17 of Figure 16; Figure 18 is a plan view of the locking thread case of the machine; Figure 19 is a side view of the locking thread case; Figure 20 is a view in section on an enlarged scale of a tension device mounted on the circumferential side wall of the thread case; Figure 21 is a developed view on the same scale of a portion of the thread case side wall; Figure 22 is a view in section of a portion of the sewing head, looking from the left of the machine; Figure 23 is a separated perspective view of certain parts shown in Figure 22; Figure 24 is a sectional view, looking from the right of the thread cutter and presser foot actuating mechanism in operating position; Figure 25 is a detail view of a portion of the thread cutter actuating mechanism in stopped position; Figure 26 is a sectional view, taken along the line 26—26 of Figure 25; Figure 27 is a sectional view looking from the left, showing the thread cutter actuating mechanism; Figure 28 is a detail view illustrating a modified cutter arrangement having a guard for the cutting edge of the cutter knife; Figure 29 is a view of a portion of the cutter guard, as seen along the line 29—29 of Figure 28; Figure 30 is a sectional view of the cutter guard, taken along the line 30—30 of Figure 28; Figure 31 is a detail sectional view of the needle and awl carrier stud; Figure 32 is a diagrammatic view indicating the looper path; Figure 33 is an enlarged sectional view of the needle guide and needle stud; Figure 34 is an enlarged detail view of the needle guide and stud; Figure 35 is a sectional view, taken along the line 35—35 of Figure 31, indicating a stopped position of the parts; Figure 36 is a similar sectional view indicating a running position of the parts; Figure 37 is a detail view of the presser-foot actuating mechanism showing the presser foot gripping the work; Figure 38 is a similar detail view, showing the presser foot lifted from the work; Figure 39 is a plan view of the thread hook actuating connections; Figure 40 is a view in elevation of the thread lock and looper actuating connections; and Figure 41 is a detail view in section taken along the line 41—41 of Figure 3.

The machine illustrated in the drawings is a high speed manually controlled wax thread shoe sewing machine, the starting and stopping of which is effected by a driving and stopping mechanism actuated by a foot treadle. To present the shoe properly to the stitch forming devices, it is guided in the machine by hand, instead of automatically as provided for in the machines of the patents above referred to. The head frame, indicated at 1, including the stitch forming devices of the machine, is supported on a vertical pedestal 2 secured to a rigid metallic base 4 of sufficient bottom area to provide proper weight distribution of both the machine and a driving motor 6 mounted thereon. The driving motor 6 operates through a belt 8 and a driving pulley 10 of the driving and stopping mechanism to rotate the main sewing cam shaft 12 of the machine. The driving and stopping mechanism is substantially the same as that illustrated and described in the present inventor's U. S. Patent No. 2,078,942 of May 4, 1937, and is controlled by the foot operated treadle, indicated at 14, maintained in raised position by means of a spring 16 within the base 4, the treadle being connected to actuate the driving and stopping mechanism through a treadle rod 18.

The stitch forming and work feeding devices of the machine include a curved hook needle 20, a curved awl 22, a needle guide 23, a shuttle or loop taker 24 within a guideway of which is mounted a hollow circular thread case 26, a looper 28, a thread hook or finger 29, main and auxiliary take-ups 30 and 32, respectively, a presser foot 33 and a work support 34. The stitch forming devices of the machine are so actuated that the pawl penetrates the work after the needle has pulled a loop of thread through the work and before the stitch being formed is set, in substantially the same manner as in the inventor's prior machines. A measured amount of locking thread is also withdrawn from the thread case and a thread lock mounted on the thread case insures that each stitch will be set uniformly according to the amount of thread withdrawn. The work is fed continously by alternate feeding movements of the presser foot and work support as a unit and of the needle as a unit while engaging the work.

To withdraw locking thread from the thread case, as in the machine of Patent No. 2,045,643, a small angular rotation is imparted to the thread case and thereafter the thread case is rotated in the reverse direction to give up the measured thread and render it available for use. The thread case is normally held from rotation with the shuttle (Figs. 16 and 17) by a pair of reciprocating pins 35 and 36 slidably mounted in a carrier 38 which is supported in the main frame of the machine. The pins are moved alternately towards and from engagement with notches in one lateral edge of the thread case to permit one side of the needle loop to pass between the thread case and the carrier.

To rotate the thread case, the carrier 38 which is rotatably mounted in the frame is oscillated through connections to the main sewing shaft 12, illustrated in Figures 10 to 13. There is mounted on the carrier 38, a spherical headed pin 39 connected by means of a link 40 with the outer end of a bell crank lever 41. The bell crank lever 41 is fulcrumed on a shaft 42, and the outer end of the lever supports a spherical headed pin 43, the ends of the link 40 being formed with suitable sockets surrounding the pins 39 and 43. The bell crank lever 41 is formed at its inner end with a pair of parallel slotted arms within the slots of which are mounted a pair of rectangular sliding blocks 44 having aligned openings in which is rotatably mounted a pin 45 (see Fig. 12). Mounted on the pin 45 between the blocks 44 is a rectangular block 46 slidable between the forked arm portions of a lever 47. The lever 47 is actuated by a cam on the main sewing shaft 12, and the extent of movement imparted by the lever to rotate the carrier 38 is adjustable by sliding the blocks 44 and 46 along the arms in which they are mounted, as hereinafter described.

The thread lock in inventor's previous machines is actuated by a roll carried by the rotary shuttle to engage the lock during each rotation. The lock of these machines consists of a lever mounted for pivotal movement about an axis extending parallel to the center of rotation of the shuttle, and the roll moves one arm of the lock lever towards and from the center of the shuttle in opening the lock. In order to pass each needle loop about the thread case in as short a time as possible, the shuttle is rotated several times during each cycle of the machine, and the thread lock, as a result, is opened one or more times unnecessarily after each length of thread has been measured, thus providing an opportunity for changes in the amount of locking thread available for each stitch.

In the embodiment of the present invention, the lock on the thread case is held open only during the time a length of thread is being drawn from the thread case so that, after measurement, the grip of the lock will be retained continuously until after the measured length of thread has been used up. The thread lock lever of the present machine is indicated at 48 in Figures 16 to 21 and is pivotally mounted within an opening formed by cutting away a portion of the circumferential side wall of the thread case. The pivot for the lever consists of a pin 49 extending radially of the thread case through the side wall thereof so that the thread lock lever moves in a direction substantially parallel to the side wall. The lock lever 48 is also curved so as to coincide substantially with the curvature of the thread case wall. The gripping jaws for the thread lock are in the form of lugs 50 and 51, one of which is on the lever 48 and one of which is on the thread case.

To actuate the thread lock lever 48, the lever is formed with a right angled arm at one side of the pivot pin 49 opposite the main body of the lever, which arm extends through a slot 52 in the circumferential side wall of the thread case. The slot 52 provides an opening in the lateral edge of the thread case wall and the right angled arm of lever 48 extends close to the opening so that, when pressure is applied to the arm, the locking lug 50 will be separated from the lug 51. The lock is normally held closed by a spring 53 compressed between the wall of the thread case and the lever 48. To move the lever against the force of the spring a reciprocating rod 54 is slidably mounted in a bore in the carrier 38 with its lengthwise axis in alignment with the slot opening 52 in the edge of the thread case wall. When the rod 54 is moved within the slot 52, it engages the right angled arm of lever 48 to release the lock. The rod is actuated, by mechanism hereinafter more fully described, only during the time the thread case is rotated to measure thread, and thereafter it is moved out of engagement with the thread lock lever so as not to interfere with passage of the needle loop around the thread case.

The thread supply within the thread case is in the form of a wound bobbin 55 and the thread is carried through a slot 56 in the side of the thread case. The slot is covered at one end by a spring tension member 57 and at the other end is freely accessible for easy threading. From beneath the tension member 57 the thread passes between the gripping lugs 50, 51, along a groove formed in the lever 48, and through an open sided guide 58 at the lower end of the lever nearest the work. The arrangement of the lever and the guide 58 are such that when tension is applied to the locking thread in setting a stitch, the grip on the thread is increased. The direction of pull on the lever by the thread applies a more effective grip to the thread than with the lever mounted, as described in inventor's prior machines, where the pivot of the lever is arranged parallel to the shuttle axis.

The spring tension member 57 is formed of flat material provided with a somewhat greater curvature than the side wall of the thread case. The tension member is secured to the thread case at one end and at its other end engages the thread leaving the slot 56 to exert a pressure on the thread. To hold the spring tension member in place, the secured end of the tension member is formed with offset tongues 59 and 60. The end portion of tongue 59 extends substantially parallel to the main body of the tension member. To cooperate with these tongues, the side wall of the thread case is formed with suitable openings through which the tongues are inserted. In applying the tension member to the thread case, the tongue 59 is first introduced into its opening and the tension member is pressed into registry with the side wall. The member is then moved along the surface of the thread case to engage the parallel portion of tongue 59 with the inside of the thread case wall and, when the tongue 60 enters its opening, the tension member is locked in place.

The mechanism for actuating the thread lock rod 54 comprises a short sleeve 62 to the central portion of which the rod 54 is threaded, a cylindrical block 64 slidable within the sleeve 62 and a rod 66 on which the block 64 is slidable and which is supported at its ends in a pair of arms extending from a hub 68 secured to a horizontal shaft 70. The rod 66 passes through enlarged openings in the sides of the sleeve 62 so that, when the carrier 38, in which the rod 54 is mounted, is rotated, the sleeve 62 may slide with relation to the rod 66 without engaging the rod. The shaft 70 is supported by bearings in the head 1 of the machine, and at its left end carries an arm 72, connected with the forward end of a lever 74 (Figs. 10 and 13) fulcrumed on a shaft 76. The rearward end of the lever 74 carries a cam roll 78 engaging a cam on the main sewing shaft 12.

Between the lever 74 and the arm 72 there is provided a yielding connection so that, if the thread case happens to be moved out of its proper position, the rod 54 moving against the lateral edge of the thread case rather than within the slot 52, will not be broken. The connection comprises two telescoping members 80 and 82, the ends of which are provided with suitable sockets to form universal connections with spherically headed pins 83 and 84, respectively secured in the arm 72 and lever 74. Within the telescoping members is compressed a spring 85 and the members are prevented from separation by a pin 86 extending through the member 82 and engaging slots in the member 80.

If the thread lock on the thread case were held closed when the machine is stopped, it would be impossible to withdraw additional thread frequently needed to insure proper formation of the initial stitch in a new seam. The shape of the cam engaging the follower 78 therefore is such that, when the machine is brought to rest by the driving and stopping mechanisms, the rod 54 will be brought into engagement with the lock lever 48 to release the lock.

Each stitch is set against a uniform tension in the needle thread provided by a tension wheel 87 (Figs. 2 and 10) of the usual form, secured to a shaft 88 rotatable in the main frame. The tension wheel is entirely enclosed by a suitable hinged cover 89 and behind the tension wheel is a brake 90 arranged for convenient adjustment. From the tension wheel the needle thread passes over a series of pulleys 91, and about the main and auxiliary take-ups 30 and 32 to the stitching point.

The present machine is provided with a thread cutter which acts to sever the thread while the work is held clamped between the work support and the presser-foot in substantially the same manner as in the Patent No. 2,037,721. To enable the cutter to move in the line of feed from one side of the point of operation of the stitch forming devices, the cutter is mounted on a vertical shaft 92 (Figs. 8, 13 and 24 to 27) with its axis at the right of the shuttle and the point of operation of the needle and awl.

The cutter consists of a curved knife 93 of rectangular section clamped in place within a suitably shaped block 94 secured at the lower end of the shaft 92. The lower end of the shaft is formed with a flanged portion to which the block 94 is bolted. The block 94 is formed at its lower portion with a slot inclined at an angle to the axis of the shaft 92 and within the slot is fulcrumed by means of a bolt 96, a clamping lever 98, the lower end of which grips the knife near its cutting edge, and holds it in place. The other end of the lever 98 is engaged by a clamp screw 100 provided with a suitably knurled head and threaded through a portion of the block 94 to rock the clamp lever 98 about the fulcrum bolt 96 into clamping engagement with the knife. By releasing the clamp screw 100, the cutter may easily be replaced or removed for sharpening. To actuate the cutter, the cutter shaft 92 is slidably and rotatably mounted in bearings of a bracket 101 to permit the knife to be moved in a helical path, the shaft being rotated and reciprocated simultaneously by two different trains of connections. Surrounding the shaft 92 between the bearings of the bracket 101 is a pair of perforated lugs extending laterally from a vertically disposed rack 102 sliding in the bracket 101. Between the lugs of the rack there is mounted a collar 103 pinned to the shaft so that when the rack is raised or lowered the shaft will be moved correspondingly. The rack 102 meshes with a gear segment 104 on a horizontal shaft 105 which is oscillated first in one direction and then the other. To oscillate the shaft 105 there is mounted at its left end a gear segment 106 intermeshing with horizontal rack teeth formed in a power actuated horizontal bar 107. The bar 107 is mounted to slide within a passage within the bracket 101.

To rotate the cutter shaft 92, the rack bar 107 has in addition to the horizontal rack teeth, a set of vertical rack teeth along its right side meshing with the teeth on a gear segment 108 formed on one arm of a lever 110. The lever 110 is fulcrumed on a vertical stud 112 secured in the cutter bracket and the other arm of the lever is formed with a toothed segment 114 meshing with a similar segment 116. The hub of segment 116 rotates within the upper bearing for the shaft 92 and is provided with a squared central opening through which the squared upper end of the shaft 92 passes. When the rack bar 107 is reciprocated the connections thus described cause the cutter shaft 92 to be rotated simultaneously with the vertical reciprocation.

The shaft 92 is so arranged with relation to the point of operation of the stitch forming devices that its axis will intersect the work substantially in the line of feed, and at a point a sufficient distance to the right to insure that the cutting edge of the knife will engage the last-formed stitch in the work when operated. The helical path, described by the knife edge forms an acute angle with the surface of the work so as to penetrate the work in a direction transverse to the seam line and to cut both the needle and locking threads in the desired manner.

To cause the cutter to penetrate a uniform distance below the upper surface of the work during each operation, regardless of the thickness of the work, the connections for reciprocating the cutter shaft 9 vertically are adjusted by means of connections controlled by the presser-foot as it engages the work. The segment 104 is mounted for relative movement on the shaft 105, and is caused to rotate sooner or later with relation to the start of the rotary movement of the shaft with thin or thick work, respectively.

On the shaft 105 near its right end is formed a series of screw threads 117 engaging corresponding threads within the segment 104. When the shaft 105 begins its rotation to actuate the cutter, the rack 102 is held from downward movement by a yieldingly actuated pin 118 (see Fig. 13) engaging the side of the rack. The segment 104 therefore is held from rotation and moves lengthwise of the shaft. To cause the segment 104 to start rotating with the shaft at the proper point there is provided a square sided wedge shaped washer 119 loosely surrounding the shaft and a wedge shaped block 120 cooperating with the washer 119. The wedge shaped block 120 is provided with a slot 121 through which the shaft 105 passes and the block is formed with a guideway extending parallel to the slot 121, in which guideway the washer 119 is loosely held to prevent it from rotating with the shaft 105. The wedge shaped block 120 is connected with a feeler comprising a rod 122 sliding in a passage formed in the bracket 101. The block and feeler rod are moved downwardly, before the cutter operates, to a position determined by the thickness of the work. With thinner work, the feeler rod 122 and wedge block 121 are moved to a lower position when actuated, and with thicker work to a higher position. Due to the wedging action between the block 120 and washer 119, the amount of relative lost motion between the shaft 105 and the gear segment 104 is regulated so as to change the reciprocating stroke of the cutter shaft 92 correspondingly.

To adjust the position of the feeler rod 122 with relation to the thickness of the work, the presser-foot 33, which is mounted on a lever 124 is provided with an upwardly extending arm to be engaged by the lower end of the feeler rod during its downward movement. The feeler rod is held in raised position during sewing by a yieldingly actuated pawl 126 pivotally mounted in the upper end of the block 120. The pawl is engaged by a dog 128 and, when the dog is moved from beneath the pawl, a spring 130 compressed between a shoulder at the upper end of the rod receiving passage in the bracket 101 and an enlargement at the lower end of the rod forces the rod downwardly against the presser-foot lever. The dog 128 is rotatably mounted on the hub of the gear segment 104, but is provided with a circular slot surrounding a circumferential rib 132 on the gear segment. To actuate the dog as soon as the shaft 105 begins to rotate, so that the feeler may be engaged with the presser-foot lever before the thread cutter has been moved any substantial distance, a slotted portion of the dog extends beyond the rib 132 on the segment 104 and surrounds a stud 134 secured in the shaft 105. To limit the relative lost motion between the gear segment 104 and the shaft 105, the gear segment is formed with axially extending portions also surrounding the threaded stud 134.

When the thread cutter has reached its lowermost thread cutting position, as shown in Figures 13, 24 and 27, it is immediately retracted from engagement with the work through substantially the same path as taken during its downward movement. To cause the thread cutter shaft 92 to be raised simultaneously with the beginning of its reverse rotation after cutting the threads, a one-way driving clutch connection is provided between the shaft 105 and the segment 104. Surrounding the shaft 105 at its right end, there is a bushing 136 secured to the shaft by means of a pin 138. Between the axially extending portion of the segment 104 and the bushing 136 there is wedged a roll 140 pressed towards locking engagement with the bushing 136 by a compression spring 142. When the shaft 105 begins its reverse rotation, after the threads are cut, the roll 140 causes the segment 104 to start its reverse rotation with the shaft immediately. When the reverse rotation of the shaft 105 is nearly completed the roll 140 is moved from locking engagement with the bushing 136 so that the gear segment 104 may be held from rotation and moved along the shaft by the threads 117 until the segment reaches its original starting position. To disengage the roll 140 there is mounted in the cutter bracket 101, a pin 144 having its inner end shaped in the form of a wedge to force the roll 140 against its spring 142 when the segment 104 has nearly reached its original starting position.

To relieve the presser-foot from the pressure of the feeler rod during sewing operations, the upper portion of the block 120 is formed with a right angled finger extending over a pin 146 at the end of an arm of a forked lever 198 rotatably mounted on a horizontal shaft 150. After the thread cutter has engaged the work, the lever 198 is rocked upwardly by mechanism hereinafter described to disengage the feeler 122 from the presser-foot lever 124 and also to raise the presser-foot itself from the work. When the feeler rod is raised, the pawl 126 immediately engages the dog 128 to hold the feeler rod from again contacting the presser-foot lever.

When the cutter knife 93 is in inactive position, its exposed edge may, if desired, be protected by a guard as more particularly illustrated in Figures 28, 29 and 30. The guard is arranged to be located in a position covering the edge of the knife and, when the cutter is actuated, the guard is automatically unlocked, so that the knife edge may be projected against the work.

When the cutter guard is used, the knife clamping lever 98 is provided with a lug at its upper end, and the guard, in the form of a channel shaped arm 152, is pivotally mounted on a pin 154 secured in said lug. The cutter clamping lever is further modified by the provision of an opening 156 from which extends a compression spring 158 surrounding a right angled tongue bent up inside the guard arm 152. The free end of the arm is formed with an opening through which the cutter knife may pass and a finger 160 formed integrally with the arm acts as a stop to hold the arm against the action of the spring in a position covering the edge of the knife. The guard is held locked in this position by means of a latch 162 formed of spring metal secured to the cutter mounting block 94. The latch member is perforated to fit over the fulcrum bolt 96 for the cutter clamping lever, and is held in position by a pin 164 extending from the block and a nut 166 threaded to the end of the fulcrum bolt. The latch member is provided with a right angle latch portion at its lower end, beneath which the side flange of the guard arm 152 is held. When the cutter is projected against the work, the rounded lower end of the latch member engages the presser-foot to raise the latch portion from engagement with the guard arm 152 so that when the guard arm contacts with the work it may remain stationary during the continued advance of the cutter.

In operating upon certain types of work, it is desirable to provide an additional length of locking thread at the beginning of each new seam. For this purpose the latch member 162 is constructed with a thread measuring arm 168 which is located to engage the thread extending between the thread case and the work, as illustrated in Figures 28 and 29, just before the cutter severs the threads. The thread measuring arm deflects the thread over the work engaging portion of the presser-foot to pull off a sufficient length for proper starting of a new seam. The thread measuring arm, being formed of the same material as the latch member 162, is rounded at its lower end in a manner similar to the lower end of the latch member so that it may be raised slightly to clear the presser-foot in measuring the thread.

The power driven mechanism for reciprocating the thread cutter actuating rack bar 107 comprises a link 170 (Figs. 5, 6 and 8) pivotally connected at its forward end to the rearward end of the rack bar and a cam actuated lever 172 connected to the rearward end of the link 170. The lever 172 is fulcrumed at its lower end on a bolt 174. Intermediate the ends of the lever is a follower 176 engaging a cam 178 rotatable on a shaft 179 at the rear of the sewing shaft 12. The cam 178 is connected with a one-revolution clutch having a driving part 180 and relatively movable driven parts 182 and 184 of the same construction and mode of operation as described more particularly in the present inventor's U. S. Patent No. 2,078,942 above referred to. The clutch is brought into operation whenever the driving and stopping mechanism is actuated to stop the machine during the final movements of the sewing shaft 12.

The presser-foot is locked in gripping engagement with the surface of the work by yielding means acting through an arrangement of locking wedge blocks similar to that described in the U. S. patent to Ashworth No. 1,756,502 of April 29, 1930. In the machine of that patent as well as in inventor's Patent No. 2,031,479 the connection between the presser-foot lever and the locking wedge blocks is at the rearward side of the fulcrum of the presser-foot lever opposite the work engaging surface of the presser-foot and beneath the presser-foot lever.

To improve the operation of the presser-foot actuating connections of the present machine, the presser-foot locking wedge blocks are mounted above the presser-foot and a single link 186 (see Figs. 8, 37 and 38) is pivotally connected between one of the wedge blocks and the presser-foot lever 124. The fulcrum for the presser foot lever 124 comprises a horizontal shaft 187 at the rearward end of the lever. The link 186 is so connected to the presser-foot lever that it acts under compression along a line passing between the work engaging surface of the presser-foot and the axis of the fulcrum shaft 187 as close as possible to the work engaging surface of the presser foot. With the connections arranged in this manner, if there is any looseness in the fulcrum of the presser-foot lever or elsewhere there will be no tendency of the presser-foot, after being locked, to move as a result of this looseness. As an additional precaution, the upper end of link 186 is inclined slightly towards the left as shown in Fig. 37, so that during feeding movement of the presser-foot towards the left the grip on the work will be tightened.

The presser-foot link 186 is connected at its upper end to a wedge block 188 mounted to slide in a wedge box 190 secured in the machine frame with one of the wedging surfaces of the block in contact with an inclined surface on the wedge box. To force the presser-foot wedge block 188 downwardly, it is engaged along its other wedging surface by a locking wedge block 192 also mounted within the wedge box 190. Formed integrally with the locking wedge block 192 is an upwardly extending rod portion, the upper end of which carries a pin 194. Pivoted on the opposite ends of the pin 194 at either side of the rod portion is a pair of links 196, the lower ends of which are pivotally connected to the arms of the forked lever 198 surrounding the rod portion of the locking wedge block 192. The lever 198 is rotatably mounted on the shaft 150 and has an upstanding arm 200 connected with one end of a tension spring 202, the other end of which is connected with a lug formed on the frame of the wedge box 190. The spring 202 acts to force the locking wedge block 192 against the presser-foot wedge block 188, thus imparting a downward pressure of the presser-foot against the work.

To raise the presser-foot intermittently from the work during sewing, the rod portion of the locking wedge block 192 is surrounded at its central part by a yoke 206 (see Figs. 24 and 27) between a pair of lugs of which a gripping arm 208 is pivotally mounted. The yoke 206 is normally held in lowered position by a spring 210 surrounding the rod portion of the locking wedge block between the yoke 206 and a bearing 212 rigidly connected with the wedge box 190. The gripping arm 208 is forked at its rearward end and surrounds a squared block 214 pivoted between the parallel arms of a lifting lever 216 also fulcrumed on the shaft 150. The lever 216 has a slotted arm in which is adjustably secured the pivot 218 for one end of a link 220, (Fig. 8), the other end of which is connected to a cam actuated lever 221 fulcrumed on a horizontal shaft 222. When the lever 221 is actuated, the cam-shaped forward end of arm 208 acts directly against the locking wedge block to raise it a predetermined distance during each cycle of operations of the machine. The lever 221 then lowers the gripping arm until the yoke 206 strikes a right angle plate 223 adjustably secured to the wedge box 190. Further downward movement of the lever 221 then causes the grip of arm 208 to be released so that the spring 202 may again move the presser-foot yieldingly against the work as shown in Fig. 37.

To cause the presser-foot wedge block 188 to be raised to the position of Fig. 38 with the locking wedge block, there is provided a train of connections between the locking wedge block and the presser-foot block 188, separate from the connections for actuating the locking wedge block. These connections comprise a lever 224 pivotally connected at its right end with the locking wedge block, intermediate its ends with a link 226, and at its left end with a link 228. The link 226 is connected with the presser-foot wedge block and the link 228 with the stationary locking wedge box 190. The link 228 is formed with an enlarged opening through which a stud 230 threaded into the frame of the wedge box passes, so that a small amount of lost motion will be permitted in the connections. The lever 224 is of such proportions that it will cause the presser-foot block to travel at the same rate of movement relatively to the movement of the locking wedge block in retracting the presser-foot from the work as when moved by the wedging surface of the locking block in forcing the presser-foot against the work. The movement imparted by the locking wedge block to the presser-foot block is slower than the movement of the locking wedge block so that the corresponding movement produced by the link and lever connections, thus described, to the presser-foot block is also slower than that of the locking wedge block. By so connecting the wedge blocks the locking block may be actuated directly by the actuating mechanisms, and no springs or other yielding connections are required to lift the presser-foot from the work during sewing.

The mechanism for raising the presser-foot at the end of the seam comprises an upstanding arm of a lever 231 having a horizontal arm underlying a set screw 232 carried by the lever 198. The lever 231 is connected to the forward end of a link 233, the rearward end of which is pivotally connected with a cam actuated lever 234 (Fig. 8). The cam 236 for actuating the lever 234 is rotated by the one-revolution clutch 180—184, hereinbefore referred to, and the relation between the cam 178 which actuates the thread cutter, and the cam 236 is such that the presser-foot is raised only after the thread cutter has completed its operation.

To maintain the presser-foot in raised position the hub of lever 198 is formed with a suitably shaped lug and a latch 238 (see Figs. 24 and 27) mounted in a lever 240, fulcrumed on the shaft 222, is disposed directly above the lug. When the presser-foot is raised the forward end of the latch lever 240 is raised against the force of a spring-pressed plunger 242 (Fig. 8) slidably mounted in the lever and disposed to engage the under surface of a portion of the machine frame. The latching end of the lever 240 then moves in front of the lug to hold the lever 198 in raised position.

To release the presser-foot and permit it to engage the work when the treadle is depressed, the rearward end of the latching lever 240 is connected by means of a pin 244 on the lever passing through the slotted upper end of a link 246. The lower end of link 246 is connected to an arm 247 clamped to a sleeve 248 rotatable in the machine frame. Secured to the right end of sleeve 248 outside the machine frame (see Figs. 1, 3 and 5) is an arm 249 actuated by an arm 250 at the right end of a shaft 251 extending through suitable bearings and having an arm 252 connected at its left end to the treadle rod 18. These connections are described in more detail in the inventor's co-pending application Serial No. 833.

To prevent the thread cutter from being actuated upon stopping the machine at certain times during sewing operations, as for instance while operating upon the forepart of a shoe, there is provided in the illustrated machine a series of connections for disconnecting the thread cutter from its actuating cam lever. The thread cutter actuating link 170 is formed at its rearward end with an L-shaped slot 253 (Fig. 8) through which passes a bolt 254 secured to the upper end of the cam actuated lever 172. The rearward end of the link 170 is also connected by means of a link 255 with an arm 256 secured to one end of a shaft 257 rotatable within the sleeve 248. To the outer end of the shaft 257 is secured an arm 258 located at the right side of the machine and connected through a link 260 to a manual control handle 262. The handle 262 is rotatably mounted on a horizontal stud 264 (see Figs. 7 and 9) mounted in the main frame and at the lower end of the handle is arranged a suitable grip by means of which it may be swung forwardly or rearwardly as desired. When the handle is swung rearwardly the connections just described act to raise the end of link 170 until the horizontal portion of the slot 253 is level with the stud 254. When the link is in this position, rotation of the auxiliary clutch and cam 178 upon stopping the machine will have no effect on the thread cutter, but the presser foot will be raised to release the work so that its position may be readjusted before starting the machine again. When the handle is moved forwardly to any position except its extreme rearward position the end of link 170 is sufficiently lowered to engage the vertical portion of slot 253 with the stud 254, thereby again rendering the cutter actuable when the machine is stopped.

The presser foot and work support are mounted on a laterally sliding carriage 265 to permit them to be moved in the line of feed as best shown in Figs. 15 and 22. The feed carriage is provided with horizontal gudgeons 266 and 268 extending in opposite directions from the carriage 265 near the central part of the carriage and having a sliding engagement with circular guideways in the machine frame. To prevent rotation of the carriage about the gudgeons there is pivotally connected at the rear of the carriage the upper end of a vertical link 270, the lower end of which is pivotally mounted on the machine frame. The link 270, extending substantially at right angles to the line of feed, causes no appreciable vertical movement in the feed carriage.

To move the feed carriage in the line of feed, the gudgeon 266 at the left of the carriage is connected to one arm of a suitably actuated lever 272. When the connection is made to the feed carriage at this point the force tending to move the carriage is exerted directly along the bearing surfaces of the supporting gudgeons and the link support 270 at the rear of the carriage prevents binding of the carriage due to frictional resistance. As a result a greater accuracy in feeding movement is obtainable and the parts supported by the feed carriage 265 are more effectively operated.

The arm of the feed carriage actuating lever 272 which cooperates with the end of the gudgeon 266 is formed at its end with two vertical separated forked portions, between the ends of which are slidable a pair of blocks 274. The blocks 274 are pivotally mounted upon a vertical pin 276 secured within the end of the gudgeon 266 (Figs. 7 and 10). The lever 272 is mounted on a vertical shaft 278 in the frame and is provided with a laterally extending arm pivotally connected by a link 280 with a lever 282. The lever 282 is supported on a horizontal shaft 284 carried by the machine frame and the lever is formed with an elongated hub carrying a pair of arms pivotally connected one at each side to an open oscillating frame 286. The frame 286 carries a cam roll 288 cooperating with a cam on the sewing cam shaft and is pivotally connected by means of a pin 290 with the lower end of a link 292, the upper end of which is rotatably mounted on a stud 294 secured in one extremity of a yoke member 295. When the sewing shaft is rotated the frame 286 is rocked about the shaft 284 and stud 294 as centers, the lever 282 and link 292 acting as guides for the movement of the frame. The link 292 and that portion of frame 286 between pin 290 and the pivotal connection of lever 282 comprise a pair of toggle members for driving the feed slide, the relative position of stud 294 determining the amount of movement imparted to the feed slide.

The needle and awl are mounted on toothed segments 296 and 297 respectively (Figs. 15 and 31), oscillating about a carrier stud 298, the right end of which is loosely supported in a plain bearing 300 fixed to the machine frame and the left end of which is supported in a threaded bearing 301 on the feed carriage 265. The left end of the stud is formed with screw threads engaging the threaded bearing of the feed carriage as described in further detail in inventor's Patent No. 2,031,479. To impart separate feeding movements to the needle stud 298, the stud is oscillated by means of a gear segment 302 formed on the stud engaging a corresponding segment 304 (see Fig. 14) secured to one end of the shaft 306 loosely mounted in the machine frame. To actuate the segment 304, at the other end of the shaft 306 there is clamped an arm 308 pivotally connected by means of a link 310 with a second open oscillating frame 312. On the link 310 there is mounted a roll 314 engaged between the forked portions of a plate 316 rigidly mounted on the shaft 284 and a shaft 318 supported in a fixed bearing in the machine. The frame 312 is mounted at its lower end on a pin 320 carried by a link 322 rotatably mounted on a stud 324 secured in the yoke member 295, the stud 324 being secured in the outer end of the opposite arm of the yoke member from the stud 294. The frame 312 carries a cam follower 326 engaging a cam on the main sewing shaft so that when the sewing shaft is rotated the frame is oscillated about the stud 324 while being guided by the roll 314 between the forked portions of the plate 316 and by the link 322. The link 322 and that portion of the frame 312 between pin 320 and the pivotal connection of link 310 comprise a pair of toggle members for oscillating the stud 298, the relative position of stud 324 determining the amount of feeding movement imparted to the needle and awl.

The machine is also provided with a channeling or fudge stitch knife operating to cut a groove in the work during the back feeding movements of the needle and awl stud, in substantially the same way as in inventor's prior patents. In the machine of the patent, the connections for operating the knife cooperate with the mechanism for imparting feeding movements to the needle and awl stud. To avoid inaccuracies of movement due to lost motion or flexing of parts, the connections for operating the fudge knife in the present machine are actuated directly by the needle and awl stud rather than with its operating mechanism.

The fudge knife is best shown in Figs. 22 and 23, at 327 secured by means of a screw 328 to a block 330 rotatable about a stud 332 extending forwardly and downwardly from a vertically sliding block 334. The block 334 is mounted within a dove-tail guideway provided in the feed carriage 265 beneath the bearings for the needle and awl stud. The block 330 is formed with lugs through openings in which pass a pair of screws 336 threaded into correspondingly shaped portions of an arm 338 extending upwardly with its rounded end engaging a slot in a slide rod 340. The slide rod 340 is mounted within a passage in the bearing 300 having its lengthwise axis parallel to the axis of the needle and awl stud. The slide rod 340 has extending from its central portion a perforated plate portion secured within a groove in the needle and awl stud by a nut 342 (Fig. 31) at the end of the stud. When the needle stud is reciprocated in the line of feed the connection with the fudge knife causes the fudge knife to form a cut of exactly the same length as the back feeding movement of the needle. The block 334 has connected to its lower end an arm 344 carrying a roll 346 engaging the slot of a cam segment 348 secured to a horizontal rock shaft 350. The shaft 350 is supported in a bearing of the machine frame and at its right end is provided with an arm 352 connected by means of a link 354 with a pin 356 (see Figs. 3 and 9) retained within an arcuate slot 358 in the control handle 262. The slot 358 extends lengthwise on the control handle and when the stud 356 is moved to the upper end of the slot the center of the stud coincides with the center of the stud 264 about which the handle 262 is oscillated, so that no movement will be imparted to raise or lower the fudge knife when the handle is actuated. To change the position of the stud 356 in the slot 358 there is slidably mounted in the handle a rod 360 connected at its upper end with the stud 356 and engaged along its lower portion by a clamp screw 362 threaded into the handle.

The edge gauge is indicated at 364 in Figs. 3 and 9, mounted on an arm 366 rotatably about a fixed pivot 368. Secured to the arm 366 is a pin 370 engaging the outer surface of a second cam 372 secured to the shaft 350. The pin 370 is adjustably secured in the arm 366 by a screw 374. To hold the pin 370 against the cam, there is a tension spring 375 stretched between the arm 366 and the main frame.

The control handle 262 is so connected and arranged that it may be used not only to render the thread cutter inoperative and to move the fudge knife and edge gauge to inoperative positions, but also if desired the handle may be used to regulate simultaneously the feeding movements imparted by the presser-foot and work support as a unit and by the needle as a unit, as well as to regulate the amount of thread withdrawn from the thread case in each sewing cycle. The connections between the control handle 262 and the feed mechanism comprise a plate 376 (see Figs. 1, 2, 3 and 7) pivotally mounted on a stub shaft 378 secured in a bracket 380 carried by the machine frame. The shaft 378 is arranged with its axis in alignment with the axis of the stud 264 on which the handle is mounted. When the handle is moved towards the rear it engages a lip 382 at the lower end of the plate 376 and when it is moved forwardly a laterally extending pin 384 on the handle engages the inner end of a bolt 386 adjustably clamped within a slot in the plate 376. The plate 376 is also formed with an arcuate slot 388 in which is adjustably clamped a bolt 390, the inner end of which passes loosely through the forward end of a link 392. The rearward end of the link 392 is connected with the lower end of an arm 394 mounted at the right end of a horizontal shaft 396 (see Fig. 5). The shaft 396 extends loosely through suitable bearings in the lower part of the sewing head and at its left end is pinned to one side of the yoke member 295 to the extremities of which the cam actuated frames 286 and 312 are connected. The other side of the yoke member is rotatably mounted on a stub shaft 397 carried by the head in alignment with the shaft 396. When the shaft 396 is oscillated the positions of studs 294 and 324 are changed so as to change simultaneously the distances through which the feed carriage 265 and the needle and awl stud 298 are moved.

The connections for adjusting the amount of thread withdrawn from the thread case during each sewing cycle also are actuated by the yoke member 295 and comprise a link 398 (see Figs. 5, 6 and 10) pivotally connected at its lower end with a lug extending laterally from the upper side of the yoke member. The upper end of the link 398 is connected with a forwardly extending arm 402 formed integrally with the hub of a lever 400 rotatably supported at one side by the end of the shaft 222 and at the other side by a shaft 404 secured in bearings in the head frame of the machine. Between two parallel arms of the lever 400 there is fulcrumed a horizontal lever 406, the rearward end of which is rounded and engages a recess in a block 408 secured to the lower end of a threaded rod 410. The threaded rod 410 has a nut at its upper end and is supported loosely within a threaded sleeve 412 mounted in a threaded opening at the upper portion of the frame of the machine. The forward end of the lever 406 is pivotally connected with a perforated block 414 secured to the upper end of a rod 416, the lower end of which is connected with the pin 45 of the thread case rotating mechanism. The rod 416 is formed with a pair of lateral arms embracing portions of lever 47 and the block 46. The pin 45 is held within openings passing through the arms of rod 416 and is secured in position by means of a set screw 418 (Fig. 12) threaded into the block 46.

To change the distance below the surface of the work at which each stitch is set, the threaded sleeve 412 is provided at its upper end with a knurled wheel by means of which the threaded sleeve may be rotated. When the block 408 is raised or lowered, the sliding blocks 44 and 46 are shifted within the arms of their respective levers by the connections described without effecting the relative regulating movements imparted by the control handle.

When the control handle is moved to its rearward position to disable the thread cutter, the plate 376 is moved in a direction to shorten the feeding movements of the feed carriage and the needle and awl stud and simultaneously to reduce the length of locking thread drawn from the thread case. The handle is customarily thus moved as the sewing progresses from the shank of the shoe to the forepart. If the fudge knife and edge gauge are to be used they will be thrown into operation at the same time. When the control handle is moved to the other extreme position, as for instance when the sewing progresses from the forepart to the shank, the plate 376 will be moved to lengthen the feeding movements and the fudge knife and edge gauge will be thrown out of operation. By thus disabling the thread cutter, the machine may be stopped in the middle of a seam if necessary or desirable for any reason, without cutting the thread, and the thread cut properly upon again stopping the machine at the completion of the seam, without any attention or care on the part of the operator, other than ordinarily used in regulating the feed mechanism or the other devices which act on the shoe. The movements of the plate 376 will occur only at the ends of the control handle movement so that the cutter may be rendered operative if desired by moving the control handle to a central position without effecting a change in the feeding movements. To retain the plate 376 in position after adjusting the length of feed at one end of the handle movement, in the lower end of the bracket 380 there is loosely mounted a bolt 420 passing through an arcuate slot in the plate 376. The bolt 420 is surrounded by a spring 422 (see Fig. 5) compressed between the bracket 380 and a thumb nut 424 to provide friction of the stud in the slot of the plate 376 and prevent its movement while the machine is operated. If desired, the thumb nut 424 may be tightened to prevent any movement of the plate 376, thus holding the feed adjustment fixed during operation of the machine.

The thread hook 29 (see Figs. 39 and 40) is actuated by a cam on the sewing shaft 12, in the usual way, and the needle guide 23 is, in part frictionally actuated from the needle segment 296 and in part actuated by the engagement of a downwardly extending arm on the needle guide with a laterally projecting portion of the thread hook 29 as described in inventor's U. S. Patent No. 2,038,282 of April 21, 1936. The thread hook slides in a guideway formed in the feed carriage 265 and is provided at its rearward end with parallel flanges extending towards the right between which is an arm extending upwardly from an actuating rod 425 slidingly mounted on the frame. To the rearward end of rod 425 is pivotally connected a block 426 sliding within the lower forked end of a cam actuated lever 427.

The thread lifter and loop spreader is indicated at 428, and is arranged to be actuated in substantially the same manner as illustrated and described in inventor's patents hereinbefore referred to.

The main take-up 30, as shown in Figs. 9, 10 and 15, is mounted to oscillate close to the forwardly extending flange of a stationary casing 429. To shield the take-up and to retain the thread carried thereon in a uniformly heated condition, the side of the casing 429 is closed by a cover 430 having a horizontal hinge 431 at its lower edge mounted on the casing 429. There is also provided an auxiliary frictional tension device acting on the thread between the take-up 30 and the looper 28 to assist in looping operations.

To permit convenient access to the take-up and to the auxiliary tension device, the tension device is partly mounted on the casing 429 and partly on the cover 430 for the take-up (see Fig. 41). The tension device comprises a small spring pressed plate 432 slidably mounted in the upper part of the take-up casing 429. At one side of the plate there is a headed pin 433 passing loosely through the side of the casing 429 to hold the plate in position. The cover 430 along its upper edge is formed with a suitable surface to cooperate with the plate 432. When the cover 429 is swung open on its hinge 431 the thread between the take-up and the looper passes loosely across the surface of the plate 432. When the cover is swung into closed position a beveled portion of the thread engaging surface on the cover forces the thread slightly towards the right against the plate 432. Such an arrangement not only simplifies the threading operations, but also insures that the operator will keep the cover closed while the machine is running.

In the inventor's previous machines the work is fed continuously and the work support and presser-foot are back fed while the needle engages the work. To prevent bending of the needle due to the resistance offered by the back feeding movement of the presser-foot and work support, the needle is looped and the looper 28 moves in the direction of feed and towards the center of the needle stud during the needle feeding movement.

In the illustrated machine, the looper 28 is given additional movements in order to facilitate drawing each loop of needle thread from the shuttle and pulling it into the work to set each stitch. The looper is secured to the forward end of a carrier rod 434 (Figs. 7 and 40) pivotally connected at its rearward end to a cam actuated lever 435. Along its central portion the carrier rod 435 is clamped by a sleeve 436 connected by a link 437 to a cam actuated lever 438. At its forward end the carrier rod is slidably mounted in a guideway 439. As illustrated more clearly in Fig. 32, the orbital path of the looper is indicated at 440. When the looper is in the position indicated, the needle thread, indicated at 441, extends from the needle under tension to the looper, somewhat in the direction of feed and towards the center of the needle stud. When the needle is withdrawn from the work with the thread in its barb the looper moves towards the last needle perforation through which the thread passes, so that after the needle loop has been carried about the shuttle, the pull of the take-up 32 in drawing the loop into the work will act on the thread passing through the looper in a substantially straight line. The looper stops briefly at a point 442 beneath the needle perforation until the awl begins its work penetrating movement. To avoid interfering with the awl, the looper is then moved forwardly a short distance until after the awl has withdrawn from the work and then again moves rearwardly beneath the needle perforation which has by that time moved directly over the point 442 as the stitch is being set. Thereafter the looper continues along the path towards the thread finger 29 repeating its movements.

Due to the relatively high speed at which the present machine is operated, provision is made for supplying oil under pressure automatically to all of the moving parts. The head frame of the machine is entirely enclosed by oil retaining covers except for suitably shaped openings for the stitch forming and work feeding devices, and the frame is so arranged that all the oil collected by the covers is drained into a common reservoir or sump 443 (see Figs. 1 and 5) formed in a downwardly projecting cylindrical member 444 attached to the head of the machine. To permit the head to be raised and lowered as required for the convenience of the operator, the cylindrical member is clamped by bolts 445 within the upper slotted end of the vertical pedestal 2. The oil is drawn through a tube 446 from the sump 443 by a rotary pump 447 driven continuously by the shaft 179 at the rear of the machine. From the pump 447 the oil, under pressure, is piped through a tube 448 to a horizontally elongated manifold 449 mounted at the rear upper portion of the machine frame (Figs. 4 and 6). From the manifold 449 the oil is conducted through a tube 450 to a fan-shaped manifold 452 at the upper front of the head having its outlets disposed radially with respect to each other. From the manifolds 449 and 452 the oil is distributed to the various operating parts of the machine including the main sewing cam shaft, the cams, the driving and stopping mechanism, the stitch forming devices and their actuating connections. The construction and operation of the oiling means for the driving and stopping mechanism is more particularly illustrated and described in Patent No. 2,078,942 hereinbefore referred to. In certain instances the oil is sprayed through reduced orifices to the operating parts and in others the flow of oil is limited to approximate the requirements of the parts to be lubricated.

To prevent the oil thrown off by the cams on the main sewing shaft from reaching the work operated upon, at the front of the machine as illustrated in Fig. 8, there may be provided a baffle plate 454 extending across the front of the machine between the needle and awl stud and the connections for operating the needle and awl. To prevent the oil deflected by the baffle plate from dripping onto the operating connections at the upper edge of the opening through which the connections pass, there is secured a semi-circular oil conducting channel piece 456 one half of which is disposed at either side of the baffle plate. The channel piece 456 extends downwardly at either side of the opening, and provision is made for directing the oil carried therein, rearwardly into the machine frame.

To lubricate the shuttle and thread case, the manifold 452 is connected with a tube 458 (Fig. 4) which carries oil to the upper surface of the guideway for the shuttle. Along the tube 458 close to the manifold 452 is connected a flow restricting orifice member 460. There is sufficient oil conducted to the shuttle to lubricate also the guideway for the thread case. Any additional oil which collects on the thread case or the shuttle is carried by gravity into an upwardly curved concave metal guard 462 (see Figs. 2 and 16) surrounding the lower part of the shuttle. The guard 462 is of the proper shape to deflect each needle loop passed about the thread case and prevent the thread from being whipped against the surface of the work operated upon. At the right end of guard 462, there is formed an open rearwardly extending trough portion 464 for conducting oil within one of the covers of the main frame.

The needle and awl supporting stud 298 is formed with a central oil conducting passage 466 (see Figs. 31 to 36), the open end of which is closed by the nut 342. The stud is constructed in substantially the same way except for the lubricating passage, as in the machine of inventor's Patent No. 2,037,721 of April 21, 1936 in which there is an outside sleeve portion 468 formed integrally with the rotating segment 302. Within the sleeve portion 468 is pressed the central stud 298 so that the segment and stud operate as a unit. Through the side walls of the sleeve and stud are provided a number of radial openings 470, 472 and 474. Through the opening 470 at the right end of the stud, the oil is forced and carried along the stud through the openings 472 and 474. To force oil through the opening 470 a sleeve portion 476 of the awl carrying segment 297 surrounding the stud within the bearing 300 is formed with a radial opening 478 so that with parts in certain positions as indicated in Fig. 36, the openings 476 and 478 will be aligned with the open end of a drilled oil discharging passage 480 provided in the main bearing 300 at the right end of the stud. The passage 480 extends forwardly through the bearing from its point of support on the machine frame and leading into the passage is a similar passage 482 in the frame (Figs. 8 and 22) connected at its rearward end with an oil tube 484 connected with the manifold 449 at the rear of the machine. Close to the manifold 449 in the tube 484 is an oil limiting orifice 486 for restricting the flow of oil under pressure to a few drops per minute. From the bearing 300 a part of this oil is conducted through the central stud passage 466 and through the radial opening 474 to lubricate the threaded bearing 301 carried by the feed carriage. Any surplus oil which is not consumed may run down the inclined forward surfaces of the bearings 300 and 301 rearwardly towards the main frame of the machine.

To receive the surplus oil from the bearings 300 and 301 there is disposed beneath the bearing 300 a forwardly projecting flange 488 on the main frame (see Figs. 8 and 22). The upper surfaces of the flange 488 are inclined in the proper direction to carry the oil deposited thereon still further back into the head of the machine so that it will eventually return to the sump 443. The bearing 301 as shown in Figs. 9 and 15, is arranged just above the guideway 439 between parallel guiding surfaces of which the looper carrier rod 434 is mounted. The lowermost forward edges of the looper guideway surfaces project beyond the upper guiding surfaces and are provided with oil receiving grooves 490 within which surplus oil is caught. The grooves 490 are so arranged that surplus oil dropped from the threaded bearing 301 will first drop on the looper carrier rod 435 and then will be received within the grooves 490 from which it will be carried back into the main frame.

To enable the needle to be lubricated, a sleeve portion 492 of the needle segment 296 is formed with a radial passage 494 (Fig. 33) brought into alignment at certain times during operation of the machine with the opening 472 in the stud. The needle guide 23 which surrounds the hub of the needle segment is provided with a circumferential groove 496 about its inner bearing surface. The groove 496 registers with the outer end of radial passage 494 in the needle stud and is connected with an outwardly directed passage 498 in the main body of the needle guide 23. At the outermost end, the passage 498 bends at an angle and follows the contour of the needle guide to its tip. The opening at the end of the passage 498 is closed by the side of the needle and any oil finding its way through the passage 498 of the needle guide is brought into contact with the needle so as to be distributed along the bearing surfaces between the needle and the needle guide.

When the machine is brought to rest by the driving and stopping mechanism it is desirable that the supply of oil be cut off from the needle and awl stud so that there will be no accumulation on the stitch forming devices. Accordingly, the openings 470 and 478 in the stud and awl segment are so arranged that they will not register with each other when the machine is stopped, as shown in Fig. 35. As a further precaution the outer bearing surface of the awl segment is formed with a by-pass groove 500 which, when the machine is stopped, registers at one end with the opening of the oil discharging passage 480 and at the other end with an opening 502 provided at the side of the bearing in such relation that the oil forced through the groove will be carried along the surface of the bearing 300 and back to the main frame in a manner previously described. The by-pass groove 500 prevents a pressure from being built up in tube 484 and passage 480 while the machine is stopped so that when the machine is restarted the parts will not suddenly be flushed with oil.

In order to provide a more accurate shape for the needle guiding opening of the needle guide 23, the outer tip of the needle guide is made separate from the main body portion thereof. Due to difficulties in forming accurately a curved hole which will fit the shape of the needle, the outer tip, indicated at 504, of the needle guide is formed in a mold, either of metal or synthetic resinous material and is secured to the main body portion by means of dowel pins and a small screw 506. Molding materials of this type ordinarily are not of sufficient strength and rigidity to provide adequate support for the needle, but by forming the main body of the needle guide 23 of steel suitable reinforcement is provided to withstand the ordinary strains imparted during sewing.

In order not to block the free movement of oil through the passage 498 in the needle guide, the inner surface of the main body portion of the needle guide which registers with the surface of the separate tip 504 is counterbored around the screw 506, the oil passing freely through the circular channel thus formed. A part of the passage 498 is formed in the separate tip 504 of the needle guide, so that when clamped in overlapping relation by the screw 506 no break in the continuity of the passage will occur.

To absorb periodic vibrations set up in the sewing head of the machine while operating, the pedestal 2 is insulated from the base 4 as shown in Fig. 1. Between the pedestal and the base is a layer 508 of resilient material, such as rubber or a gelatinous compound. The layer 508 is formed in the shape of a ring-like gasket held between inwardly directed flanges of the pedestal and base, respectively, by means of bolts 510 passing through the flanges and the resilient layer 508. To separate the bolts 510 from the flange in the base, the central parts of the bolts are surrounded by wooden sleeves 512, and a second layer 514 of resilient material similar to the layer 508 is mounted at the underside of the base flange. Beneath the resilient layer 514 is disposed a ring-like plate 516 provided with perforations through which the bolts 510 pass, and at the lower ends of the bolts are clamping nuts 518 acting against the lower ends of compression springs 520, the upper ends of which press against the plate 516. The springs 520 are for the purpose of permitting the clamping action of the bolts 510 to be more equally adjusted, while maintaining the pedestal and base without substantial relative movement. By the provision of the resilient layers 508 and 514, the vibrations set up in the sewing head are damped out before being distributed to the large surface areas engaged by the bottom of the base 4, thus preventing amplification of these vibrations.

Certain of the mechanisms which have been illustrated and described are not claimed herein, but form the subject of divisional applications, the Thread cutting mechanism forming the subject-matter of application Serial No. 200,409 filed April 6, 1938; the Lubricating means forming the subject-matter of application Serial No. 200,410 filed April 6, 1938; the Presser-foot locking mechanism forming the subject-matter of application Serial No. 200,411 filed April 6, 1938; the Feeding mechanism forming the subject-matter of application Serial No. 200,412 filed April 6, 1938; and the Thread tensioning mechanism forming the subject-matter of application Serial No. 200,413 filed April 6, 1938.

The nature and scope of the invention having been indicated, and a construction embodying the several features of the invention having been specifically described, what is claimed is:

1. A lockstitch sewing machine having, in combination, a work piercing needle, a rotary loop taker, a locking thread case about which the loop taker passes successive loops of needle thread, a thread lock on the thread case, and means for actuating the lock comprising a member arranged for movement relatively to the loop taker towards the thread case to release the lock and from the thread case to permit unobstructed passage of the needle thread between said member and the thread case.

2. A lockstitch sewing machine having, in combination, a work piercing needle, a rotary loop taker, a locking thread case about which the loop taker passes successive loops of needle thread, devices engaging the thread case to hold it from rotation, means for supporting said devices, a thread lock on the thread case, and means for actuating the lock comprising a member mounted on the supporting means and arranged for movement towards and from the thread case to permit unobstructed passage of the needle thread between the member and the lock.

3. A lockstitch sewing machine having, in combination, a work piercing needle, a rotary loop taker, a locking thread case, devices engaging the thread case to hold it from rotation, a carrier for supporting said devices, means for shifting the position of the carrier to draw off from the thread case a measured amount of locking thread for each stitch, a lock on the thread case arranged to grip the locking thread, and means for actuating the lock comprising a rod slidable lengthwise in said carrier towards and from the thread case.

4. A lockstitch sewing machine having, in combination, a work piercing needle, a locking thread case, a loop taker arranged to make a plurality of rotations in each stitching cycle and to pass a loop of needle thread about the thread case during one of said rotations, means for measuring a predetermined amount of locking thread from the thread case for each stitch, a lock mounted on the thread case to prevent locking thread from being drawn from the thread case while each stitch is being set, and means for releasing the lock only while the thread is being measured.

5. A lockstitch sewing machine having, in combination, a work piercing needle, a hollow circular locking thread case, a rotary loop taker, and a thread gripping member pivotally mounted in a circumferential wall of the thread case and formed with a thread guide movable in a direction substantially parallel to the circumferential wall of the thread case and arranged to increase the thread gripping action when a tension is applied to the locking thread.

6. A lockstitch sewing machine having, in combination, a work piercing needle, a hollow circular locking thread case, a rotary loop taker, a curved thread gripping member in a circumferential wall of the thread case with its outer curvature substantially coinciding with the curvature of said wall and a pivotal mounting for the gripping member in said circumferential wall extending radially to the curvature of said wall.

7. A lockstitch sewing machine having, in combination, a work piercing needle, a hollow circular locking thread case, a rotary loop taker, a thread gripping member pivotally mounted within a circumferential wall of the thread case with a portion extending close to the lateral edge of said wall for actuating the gripping member when moved at right angles to the lateral edge of said wall.

8. A lockstitch sewing machine having, in combination, a needle, a rotary loop taker, a hollow circular locking thread case having a portion of its circumferential wall cut away, and a curved thread gripping member pivotally mounted in said wall and arranged to extend into the cut away portion with its outer curvature substantially coinciding with the curvature of said wall.

9. A lockstitch sewing machine having, in combination, a needle, a rotary loop taker, a hollow circular locking thread case having an opening in its circumferential side wall and a yielding thread tensioning member formed of flat material with a curvature greater than the side wall and secured to said wall by means of an offset integral tongue bent into parallel relation to the main portion of said member to enter into locking engagement with the side wall when pressed through said opening and moved along said wall.

10. A lockstitch sewing machine having, in combination, a needle, a rotary loop taker, a hollow circular locking thread case, having spaced openings in its circumferential side wall and a yielding thread tensioning member formed of flat material with integral offset tongues extending at right angles to said member, one of which tongues is bent into parallel relation to the main body of the member to enter into locking engagement with the side wall when pressed through one of said openings and moved along the surface of the side wall, and the other of which is arranged to enter the other opening after the limit of movement along the surface of said wall is reached.

11. A lockstitch sewing machine having, in combination, a work piercing needle, a rotary loop taker, a locking thread case about which the loop taker passes successive loops of needle thread, a thread lock on the thread case, and means for actuating the lock comprising a reciprocating member cooperating with the lock arranged for movement towards and from the thread case, and a resilient connection for moving the member against the lock member with a yielding pressure to release the lock.

12. A lockstitch sewing machine having, in combination, a work piercing needle, a rotary loop taker having a circular guideway, a hollow circular locking thread case mounted in the guideway, yieldingly actuated devices engaging the thread case to hold it stationary while the loop taker is rotated, a lock on the thread case mounted within an opening in the side of the thread case to grip the locking thread, a member arranged for movement towards and from the thread case, and a resilient connection for moving the member within the opening against the lock to actuate the lock with a yielding pressure.

13. A lockstitch sewing machine having, in combination, a work piercing needle, a rotary loop taker, a locking thread case about which the loop taker passes successive loops of needle thread, a thread lock comprising gripping jaws mounted on the thread case between which the bobbin thread passes, and means for actuating the gripping jaws comprising a member arranged for movement relatively to the loop taker towards and from the thread case.

14. A lockstitch sewing machine having, in combination, a work piercing needle, a rotary loop taker, a locking thread case about which the loop taker passes successive loops of needle thread, a thread lock comprising gripping jaws mounted on the thread case between which the bobbin thread passes, a spring acting to hold the jaws together, and a member arranged for movement towards the thread case to open said jaws and from the thread case to permit unobstructed passage of each needle loop between the member and the thread case.

15. A lockstitch sewing machine, having, in combination, a work piercing needle, a rotary loop taker, a locking thread case about which the loop taker passes successive loops of needle thread, a thread lock comprising cooperating gripping jaws mounted on the thread case to grip the locking thread while each stitch is being set, and a driving and stopping mechanism acting, when thrown into operation, to bring the machine to rest with the lock released.

16. A lockstitch sewing machine having, in combination, a work piercing needle, a rotary loop taker, a locking thread case about which the loop taker passes successive loops of needle thread, a thread lock comprising cooperating gripping jaws mounted on the thread case to grip the locking thread while each stitch is being set, a driving and stopping mechanism acting, when thrown into operationg, to bring the machine to rest with the lock released, a thread cutter actuated to sever the locking thread at the end of a seam, and means for pulling off an extra length of locking thread through the lock on the thread case before the thread is cut.

17. A sewing machine having, in combination, stitch forming and work feeding devices, an edge gage, a work grooving knife, a cutter actuated to sever the thread when the stitch forming devices are stopped, means for changing the length of feeding movement imparted to the work by the feeding devices and for disabling the gage, knife and cutter, a control handle arranged to be shifted manually through a limited range of movement, connections between the handle and said means for rendering the gage, knife and cutter operative throughout the central portion of the handle movement, and other connections for actuating said means to change the feed at the ends only of the handle movement.

18. A lockstitch sewing machine having, in combination, stitch forming and work feeding devices comprising a rotary loop taker, a locking thread case about which the loop taker passes successive loops of needle thread, a work support and a presser foot, means for drawing off from the thread case a measured amount of locking thread for each stitch, mechanisms for actuating the stitch forming and work feeding devices to impart continuous feeding movements to the work, a control handle and connections for simultaneously changing the length of feeding movements of the work and the amount of locking thread drawn from the thread case when the handle is actuated.

19. A lockstitch sewing machine having, in combination, stitch forming and work feeding devices comprising a rotary loop taker, a locking thread case about which the loop taker passes successive loops of needle thread, a work support and a presser foot, means for drawing off from the thread case a measured amount of locking thread for each stitch, mechanisms for actuating the work support and presser foot as a unit and one or more of the stitch forming devices as a unit to impart continuous feeding movements to the work, a control handle, and connections for simultaneously changing the length of feeding movements imparted by said feeding units to the work and also for changing the amount of locking thread drawn from the thread case to correspond to the amounts required by the changed feeding movements when the handle is actuated.

20. A sewing machine having, in combination, stitch forming and work feeding devices including a work piercing needle, a needle looper, a work support and a presser-foot, mechanism for operating the presser-foot to release the work and for actuating the needle along the line of feed relatively to the presser-foot to feed the work, and mechanism for actuating the looper forwardly to lay the thread within the barb of the needle, then to the rear and in the direction of feed while the needle is feeding the work and thereafter while the stitch is being set forwardly to a position in substantial alinement with the needle perforation.

21. A sewing machine having, in combination, stitch forming and work feeding devices including a curved hook needle, an awl, a needle looper, a thread finger, a work support and a presser foot, mechanism for operating the awl to penetrate the work after the needle has pulled a loop of thread through the work and before the stitch being formed is set, and mechanism for actuating the thread engaging portion of the looper into substantial alinement with the needle perforation as a loop of thread carried by the needle is being pulled through the work and thereafter out of alinement with, but close to, the needle opening as the awl penetrates the work for a new stitch.

22. A sewing machine having, in combination, stitch forming and work feeding devices including a curved hook needle, an awl, a needle looper, a thread finger, a work support and a presser foot, mechanism for operating the awl to penetrate the work after the needle has pulled a loop of thread through the work and before the stitch being formed is set, and mechanism for actuating the thread engaging portion of the looper to remain in a position in substantial alinement with the needle perforation as a loop of thread carried by the needle is being pulled through the work, then to move to a position out of alinement with, but close to, the needle perforation, as the awl penetrates the work, and thereafter to return substantially to the said first mentioned position until after the stitch is set.

23. A sewing machine having, in combination, a work piercing and feeding instrument, a stud on which said instrument is mounted, mechanism for reciprocating said stud in the line of feed to feed the work, a fudge knife, and connections actuated by said stud for actuating the fudge knife to cut the work during the back feeding movement of said stud.

24. A sewing machine having, in combination, a work support, a presser foot, stitch forming devices including a curved hook needle, a stud on which said needle is mounted, mechanism for reciprocating the work support and presser foot as a unit and said stud as a unit in the line of feed alternately to feed the work, a fudge knife, and connections actuated by the needle stud for actuating the fudge knife to cut the work during back feeding movement of said needle stud while the work is clamped by the work support and presser foot.

25. A lockstitch sewing machine having, in combination, stitch forming and work feeding devices including a loop taker and a locking thread case, a main sewing shaft, separate mechanisms operated from the sewing shaft for actuating said devices to feed the work and for drawing off from the thread case a measured amount of locking thread for each stitch, and adjusting means common to said mechanisms for changing simultaneously the length of feeding movements of said devices and the amount of thread drawn from within the thread case.

26. A lockstitch sewing machine having, in combination, stitch forming and work feeding devices including a loop taker, a locking thread case, a main sewing shaft, a mechanism for actuating the stitch forming devices to feed the work, a mechanism for rotating the thread case to draw off from the thread case a measured amount of thread for each stitch, and adjusting means common to the feed mechanism and the thread case rotating mechanism for changing simultaneously the length of feeding movements of said devices, and the amount of locking thread drawn from within the thread case.

27. A lockstitch sewing machine having, in combination, stitch forming and work feeding devices including a loop taker and a locking thread case, a main sewing shaft for actuating said devices, a carriage and a stud relatively movable in the line of feed for supporting certain of said devices, mechanisms for reciprocating the carriage and stud along the line of feed to impart a continuous feeding movement to the work, each of said mechanism comprising an element actuated by said sewing shaft, a mechanism for drawing off from the thread case a measured amount of thread for each stitch, and adjusting means for changing simultaneously the feeding movements of the carriage and stud and the amount of locking thread drawn from within the thread case.

OTTO R. HAAS.

CERTIFICATE OF CORRECTION.

Patent No. 2,148,197.  February 21, 1939.

OTTO R. HAAS.

It is hereby certified that error appears in the above numbered patent requiring correction as follows: In the heading to the drawings, sheets 1 to 19 inclusive, name of inventor, for "O. R. HASS" read O. R. HAAS; and that the said Letters Patent should be read with this correction therein that the same may conform to the record of the case in the Patent Office.

Signed and sealed this 29th day of August, A. D. 1939.

(Seal)

Leslie Frazer,
Acting Commissioner of Patents.